(12) United States Patent
Thind et al.

(10) Patent No.: US 10,105,918 B2
(45) Date of Patent: Oct. 23, 2018

(54) INTERNAL OPTICAL ELEMENTS PRODUCED BY IRRADIATION-INDUCED REFRACTIVE INDEX CHANGES

(71) Applicant: Colibri Technologies Inc., North York (CA)

(72) Inventors: Amandeep Thind, North York (CA); Mark Harduar, Brampton (CA); Nigel Munce, Oakville (CA); Martin Jun, Victoria (CA)

(73) Assignee: Conavi Medical Inc., Toronto (CA)

( * ) Notice: Subject to any disclaimer, the term of this patent is extended or adjusted under 35 U.S.C. 154(b) by 957 days.

(21) Appl. No.: 14/357,528

(22) PCT Filed: Nov. 13, 2012

(86) PCT No.: PCT/CA2012/050799
§ 371 (c)(1),
(2) Date: May 9, 2014

(87) PCT Pub. No.: WO2013/067647
PCT Pub. Date: May 16, 2013

(65) Prior Publication Data
US 2014/0319708 A1    Oct. 30, 2014

Related U.S. Application Data

(60) Provisional application No. 61/558,125, filed on Nov. 10, 2011.

(51) Int. Cl.
*C03C 23/00* (2006.01)
*B29D 11/00* (2006.01)
(Continued)

(52) U.S. Cl.
CPC ........ *B29D 11/00355* (2013.01); *B29C 71/04* (2013.01); *B29D 11/00461* (2013.01);
(Continued)

(58) Field of Classification Search
USPC .................................................. 264/1.1–2.6
See application file for complete search history.

(56) References Cited

U.S. PATENT DOCUMENTS

| 4,514,053 A | 4/1985 | Borrelli et al. |
| 6,445,939 B1 | 9/2002 | Swanson et al. |

(Continued)

FOREIGN PATENT DOCUMENTS

CA    2406219 A1    10/2002

OTHER PUBLICATIONS

Cheng et al.,"Integrating 3d Photonics and Microfluidics Using Ultrashort Laser Pulses", SPIE Newsroom, 10.1117/2.1200611.0484, 2006, pp. 1-3.

(Continued)

*Primary Examiner* — Cynthia Szewczyk
(74) *Attorney, Agent, or Firm* — Fiala & Weaver P.L.L.C.

(57) ABSTRACT

Systems and methods are provided for forming an optical element within a transparent material using an irradiating optical beam, where the irradiating optical beam is employed to induce internal refractive index changes in the transparent substrate. Optical elements such as bulk and gradient index lenses may be formed in the transparent structure according various embodiments of the disclosure. An optical element may be formed by selecting a refractive index profile for the optical element, determining a corresponding suitable spatially dependent irradiation intensity profile for producing the selected refractive index profile, focusing an irradiating optical beam within the transparent structure, and controlling an intensity and position of the focused irradiating optical beam within the transparent structure according to the spatially dependent irradiation intensity profile.

33 Claims, 22 Drawing Sheets

(51) Int. Cl.
| | |
|---|---|
| *B29C 71/04* | (2006.01) |
| *G02B 1/12* | (2006.01) |
| *G02B 3/00* | (2006.01) |
| *B29C 35/08* | (2006.01) |
| *G02B 6/32* | (2006.01) |

(52) U.S. Cl.
CPC ............ *G02B 1/12* (2013.01); *G02B 3/0087* (2013.01); *B29C 2035/0822* (2013.01); *B29C 2035/0827* (2013.01); *B29C 2035/0833* (2013.01); *B29C 2035/0838* (2013.01); *B29K 2995/0031* (2013.01); *G02B 6/32* (2013.01)

(56) References Cited

U.S. PATENT DOCUMENTS

| | | | |
|---|---|---|---|
| 6,573,026 | B1 | 6/2003 | Aitken et al. |
| 6,628,877 | B2 | 9/2003 | Dugan et al. |
| 6,853,785 | B2 | 2/2005 | Dunn et al. |
| 6,884,960 | B2 | 4/2005 | Bourne et al. |
| 7,241,559 | B2 | 7/2007 | Borrelli et al. |
| 7,405,883 | B2 | 7/2008 | Hashimoto |
| 7,672,050 | B2 | 3/2010 | Shibata et al. |
| 7,789,910 | B2 | 9/2010 | Knox et al. |
| 7,921,672 | B2 | 4/2011 | Matsumura et al. |
| 7,969,654 | B1 | 6/2011 | Ersoy et al. |
| 8,214,010 | B2 | 7/2012 | Courtney et al. |
| 8,279,903 | B2 | 10/2012 | Shah et al. |
| 2003/0035640 | A1 | 2/2003 | Dugan et al. |
| 2003/0187119 | A1* | 10/2003 | Nishimura ........... G02B 5/1857 524/430 |
| 2004/0037505 | A1 | 2/2004 | Morin |
| 2004/0047578 | A1 | 3/2004 | Fukuda et al. |
| 2005/0056952 | A1* | 3/2005 | Walker ................ B29C 47/0014 264/1.29 |
| 2005/0056954 | A1* | 3/2005 | Devlin ................ B29C 35/0894 264/1.32 |
| 2008/0042307 | A1* | 2/2008 | Ueno .................. B29C 33/3835 264/2.5 |
| 2008/0177183 | A1 | 7/2008 | Courtney et al. |
| 2009/0052849 | A1 | 2/2009 | Lee et al. |
| 2009/0202202 | A1 | 8/2009 | Lee et al. |
| 2009/0218519 | A1 | 9/2009 | McLeod |
| 2010/0114077 | A1 | 5/2010 | Dai |
| 2010/0298933 | A1 | 11/2010 | Knox et al. |
| 2011/0071509 | A1 | 3/2011 | Knox et al. |
| 2011/0108525 | A1 | 5/2011 | Chien et al. |
| 2011/0171068 | A1 | 7/2011 | Helvajian |
| 2012/0279947 | A1* | 11/2012 | Fukuyo .............. B23K 26/0057 219/121.76 |

OTHER PUBLICATIONS

Bach et al.,"The Properties of Optical Glass", Springer, 1998, pp. 8-9.

"Foturan Photo-Sensitive Glass" (Web page), retrieved from < http://invenios.com/micro-fabrication-resources/foturan-photo-sensitive-glass/>, Retrieved: Aug. 28, 2011, 3 pages.

Zhao et al.,"Fabrication of Microstructure in LiF Crystals by a Femtosecond Laser", Chin. Phys. Lett, vol. 20 , No. 10, Jun. 2, 2003, pp. 1858-1860.

Maxein et al.,"Interaction of Femtosecond Laser Pulses with Lithium Niobate Crystals: Transmission Changes and Refractive Index Modulations", Journal of Holography and Speckle, vol. 5, No. 3, 2009, pp. 1-5.

Apostolopoulos et al.,"Femtosecond Irradiation Induced Refractive-index Changes and Channel Waveguiding in Bulk $Ti^{3+}$ : Sapphire", Appl. Phys. Lett. 85, 2004, 2 pages.

Ding et al.,"Large Refractive Index Change in Silicone-Based and Non-Silicone-Based Hydrogel Polymers Induced by Femtosecond Laser Micro-Machining", Optics Express, vol. 14, No. 24, Nov. 27, 2006, pp. 11901-11909.

Yamada et al.,"Multilevel phase-type diffractive lenses in silica glass induced by filamentation of femtosecond laser pulses", Optical. Letters, vol. 29, No. 16, Aug. 15, pp. 1846-1848.

Hsieh et al.,"Femtosecond Holography in Lithium Niobate Crystals", Optics Letters, vol. 30, No. 17, Sep. 1, 2005, pp. 2233-2234.

Beyer et al.,"Photorefractive Effect in Iron-Doped Lithium Niobate Crystals Induced by Femtosecond pulses of 1.5 μm Wavelength", Applied Physics Letters, vol. 18, 2006, pp. 1-3.

Bricchi et al., "Birefringent Fresnel Zone Plates in Silica Fabricated by Femtosecond Laser Machining", Optics Letters, vol. 27, No. 24, Dec. 15, 2002, pp. 2200-2202.

Zhang et al., "Simulation of Microscale Densification During Femtosecond Laser Processing of Dielectric Materials", Appl. Phys, Lett. A 79, 2004, pp. 945-948.

Nolte et al.,"Femtosecond Waveguide Writing: A New Avenue to Three-Dimensional Integrated Optics", Appl. Phys. Lett. A 77, 2003, pp. 109-111.

Xu et al., "Lateral Gradient Index Microlenses Written in Ophthalmic Hydrogel Polymers by Femtosecond Laser Micromachining", Optical Materials Express, vol. 1, No. 8, Dec. 1, 2011, pp. 1416-1424.

Will et al., "Optical Properties of Waveguides Fabricated in Fused Silica by Femtosecond Laser Pulses", Applied Optics, vol. 41, No. 21, Jul. 20, 2002, pp. 4360-4364.

Ye et al. "Grin Lens and Grin Lens Array Fabrication With Diffusion-Driven Photopolymer", Optical Society of America, 2009, pp. 1-2.

\* cited by examiner

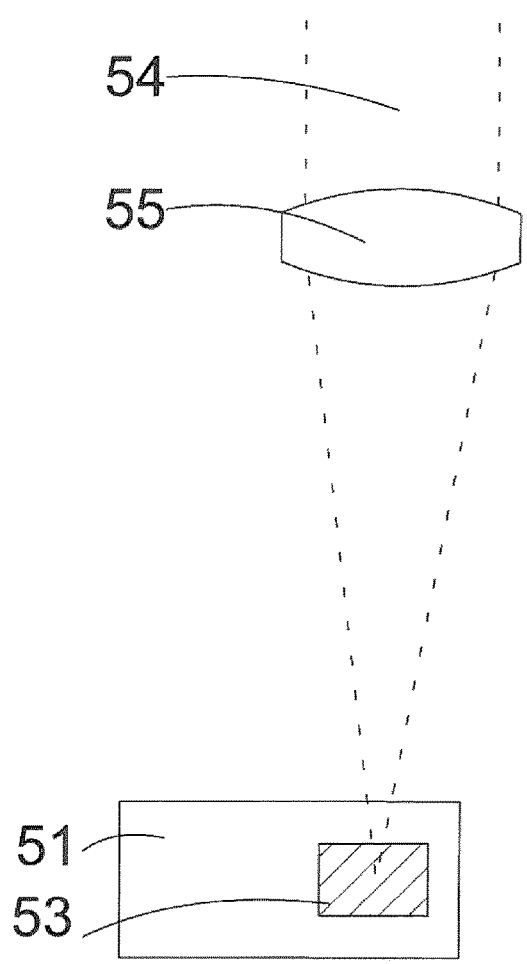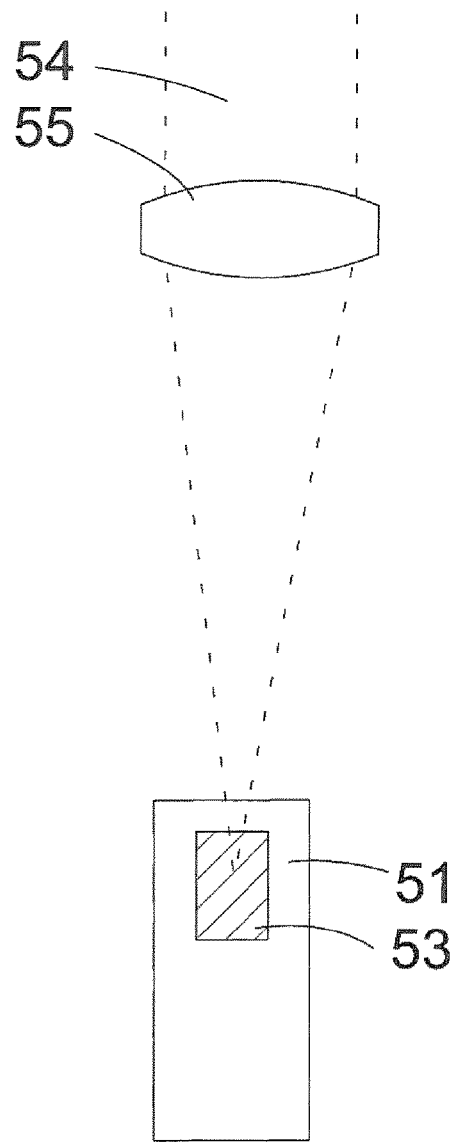
Figure 1a
Figure 1b

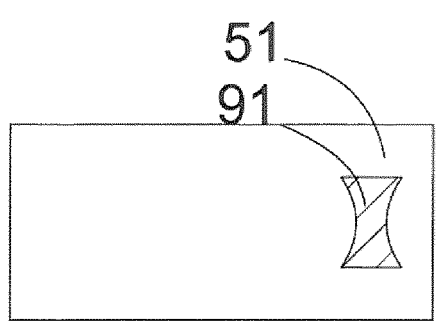
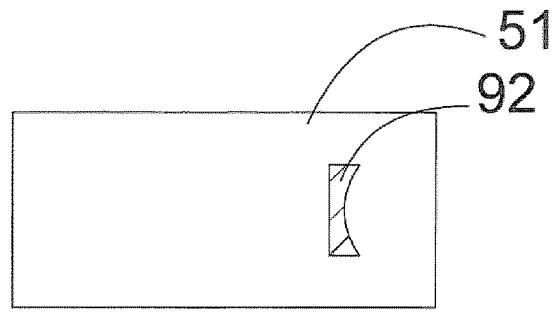
Figure 10    Figure 11
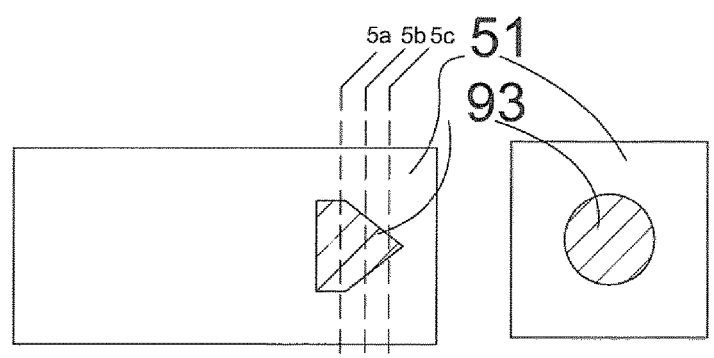
Figure 12a    Figure 12b
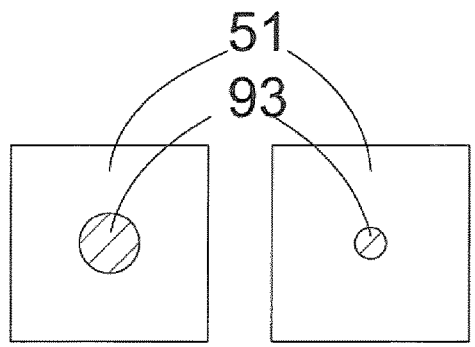
Figure 12c    Figure 12d

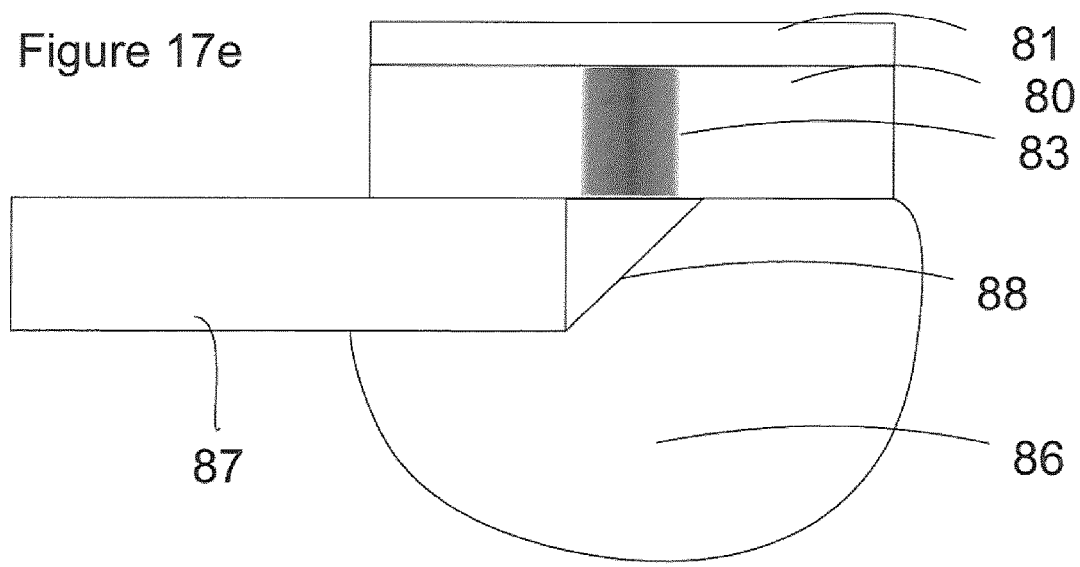

INTERNAL OPTICAL ELEMENTS PRODUCED BY IRRADIATION-INDUCED REFRACTIVE INDEX CHANGES

CROSS-REFERENCE TO RELATED APPLICATION

This application is a National Phase application claiming the benefit of PCT/CA2012/050799 filed on Nov. 13, 2012 in English, which further claims priority to U.S. Provisional Application No. 61/558,125, titled "EMBEDDED OPTICAL ELEMENTS PRODUCED BY IRRADIATION-INDUCED REFRACTIVE INDEX CHANGES" and filed on Nov. 10, 2011, the entire contents of which are incorporated herein by reference.

BACKGROUND

The present disclosure relates to methods of producing optical refractive structures within transparent materials.

Conventional optical lenses, as have been made since the time of Galileo, are produced through the polishing and shaping of glass. Another form of a lens is the gradient refractive index lens, or GRIN lens. GRIN lenses employ a spatially varying refractive index to produce a focusing effect. GRIN lenses may be produced according to a number of known methods, including ion embedding, sol-gel methods, and the use of photonic crystal fibers. Unfortunately, such methods limit the degree to which the desired properties of the GRIN lens can be controlled.

SUMMARY

Systems and methods are provided for forming an optical element within a transparent material using an irradiating optical beam, where the irradiating beam is employed to induce internal refractive index changes in the transparent substrate. Optical elements such as bulk and gradient index lenses may be formed in the transparent structure according various embodiments of the disclosure. An optical element may be formed by selecting a refractive index profile for the optical element, determining a corresponding suitable spatially dependent irradiation intensity profile for producing the selected refractive index profile, focusing an irradiating beam within the transparent structure, and controlling an intensity and position of the focused irradiating beam within the transparent structure according to the spatially dependent irradiation intensity profile.

In one aspect, there is provided a method of forming an optical element having a pre-selected refractive index profile within a transparent substrate, the method comprising the steps of: (a) focusing an optical irradiating beam within the transparent substrate, wherein beam parameters of the optical irradiating beam are sufficient to generate a permanent refractive index change, and wherein the transparent substrate is substantially transparent over a wavelength region associated with the optical irradiating beam, and scanning a position of the focus of the optical irradiating beam within the transparent substrate for forming the pre-selected refractive index profile within the transparent substrate; (b) directing an additional optical beam through the transparent substrate, such that the additional optical beam is refracted by the optical element, and measuring one or more properties of the additional optical beam after it is transmitted by the optical element; (c) comparing the one or more properties with at least one reference property to determine an error profile, the error profile associated with a difference between the refractive index profile formed by the optical irradiating beam and the pre-selected refractive index profile; and (d) controlling the beam parameters of the optical irradiating beam while scanning the optical irradiating beam to reduce the error profile.

In another aspect, there is provided a method of forming an optical element having a pre-selected refractive index profile within an acoustically active transparent substrate, the method comprising the steps of: focusing an optical irradiating beam within the acoustically active transparent substrate, wherein beam parameters of the optical irradiating beam are sufficient to generate a permanent refractive index change, and wherein the acoustically active transparent substrate is substantially transparent over a wavelength region associated with the optical irradiating beam; and wherein the optical irradiating beam is focused within the acoustically active transparent substrate such that the pre-selected refractive index profile is formed within the transparent substrate.

In another aspect, there is provided a system for forming an optical element having a pre-selected refractive index profile within a transparent substrate, said system comprising: an optical source for generating an optical irradiating beam, wherein beam parameters of the optical irradiating beam are sufficient to generate a permanent refractive index change when the transparent substrate when the transparent substrate is substantially transparent over a wavelength region associated with the optical irradiating beam; a focusing and scanning apparatus for focusing the optical irradiating beam within the transparent substrate and scanning a position of the focus of the optical irradiating beam within the transparent substrate for forming the pre-selected refractive index profile within the transparent substrate; an additional source for generating an additional optical beam and transmitting the additional optical beam through the transparent substrate, such that the additional optical beam is refracted by the optical element; and a detector configured to measure one of more properties of the additional optical beam after it is transmitted by the optical element.

In another aspect, there is provided a method of modifying the refractive index of an optical component embedded within an ultrasonic transducer, the method comprising the steps of: focusing an optical irradiating beam within the optical component, wherein beam parameters of the optical irradiating beam are sufficient to generate a permanent refractive index change, and wherein the optical component is substantially transparent over a wavelength region associated with the optical irradiating beam, and scanning a position of the focus of the optical irradiating beam within the optical component.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 1(a) to (c) illustrate a method of forming an optical element (a) within a transparent structure and (b) along a longitudinal axis of a transparent structure, by a focused optical irradiating beam. FIG. 1(c) provides a flow chart illustrating a method of forming an optical element within a transparent structure according to one example embodiment.

FIG. 10 illustrates a double concave optical element fabricated inside a substrate.

FIG. 11 illustrates a single concave optical element fabricated inside a substrate.

FIGS. 12 (a)-(d) illustrate an axicon lens element fabricated inside a substrate, showing (a) a side view and (b), (c) and (d) cross-sectional views through sections 5a, 5b and 5c.

DETAILED DESCRIPTION

Figure 1C:
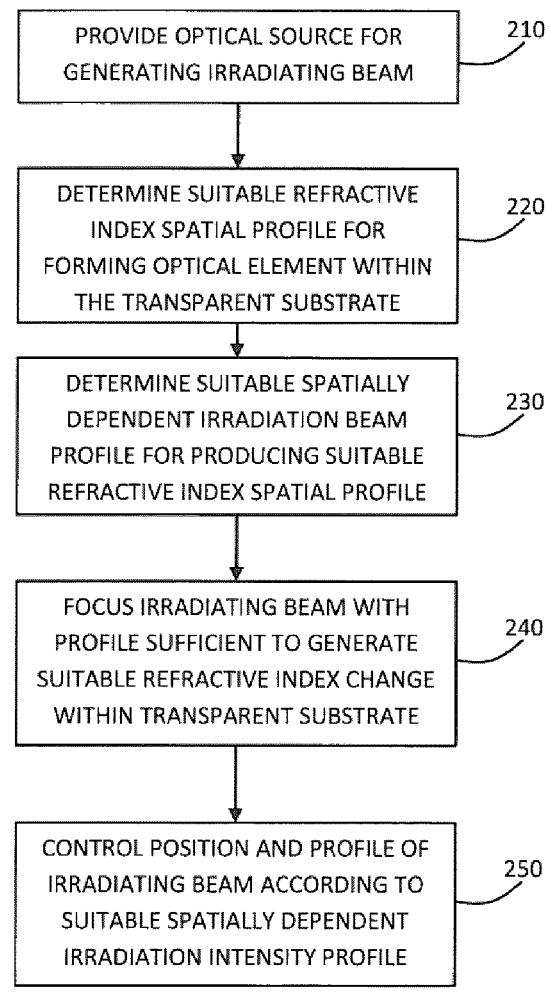

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "wavelength range" refers to both continuous and discontinuous wavelength ranges.

In selected embodiments as described below, an optical refractive element is produced within a transparent structure by inducing localized index of refraction changes by irradiating the structure with an irradiating optical beam. The irradiating optical beam has a wavelength, intensity and fluence that is suitable for inducing a non-transient change in the refractive index within the transparent structure when the irradiating optical beam is focused within the transparent structure. During irradiation, the position of the focus of the irradiating optical beam is positioned such that the induced refractive index change is generated with a spatial profile suitable for forming the internal optical refractive element. The optical refractive element is formed such that it acts as a lens or other refractive element when an internal optical beam is incident on the internal optical element from within the structure. In some embodiments, the internal optical element is a gradient index (GRIN) optical lens.

The transparent structure may be any structure having a transparent internal volume and exhibiting refractive index change in response to irradiation with a suitable optical beam. Examples of transparent structures include transparent substrates and optical fibers. The transparent structure may be a composite structure that is only optically transparent over a subset of its total volume or spatial extent.

The properties of the material forming the transparent structure, and the parameters of the focused irradiation beam, are selected such that a suitably large refractive index change is locally produced within the transparent structure in response to the focused irradiating optical beam. In some embodiments, the refractive index change may be on the order of $10^{-3}$ to $10^{-2}$, depending on the properties of the irradiating optical beam and the irradiated material.

In some embodiments, the material may exhibit an induced refractive index change in response to the irradiating optical beam provided that the irradiating optical beam does not exceed an intensity or fluence threshold. In other embodiments, the material may exhibit an induced change in refractive index that occurs only after a threshold intensity and/or fluence has been delivered to a given focal volume within the transparent structure where the irradiating optical beam is focused. Accordingly, a two- or three-dimensional refractive index spatial profile may be written or transcribed into the transparent structure by varying the location of the focal volume within the transparent structure, thus defining the internal optical element.

The writing of the refractive index spatial profile may be achieved by scanning the irradiating optical beam relative to the transparent structure. Scanning of the beam may involve changing the position and/or orientation of the incident beam and/or the transparent structure, for example, using a scanning mechanism. The scanning mechanism may include one or more scanning mirrors and/or one or more translation devices.

It is to be understood that the irradiating optical beam may produce a change in both the real and imaginary refractive index, and that changes in the imaginary refractive index may be induced, provided that when transmitting an incident optical beam through the internal optical element, the optical beam is transmitted without substantial optical absorption.

Suitable materials for forming the transparent structure include glasses and polymers that are known to exhibit a change in refractive index in response to optical irradiation. The transparent structure, or transparent portion of the structure, may be formed at least in part from a transparent plastic such as polymethylmethylaccrylate (PMMA), PDMS, or polycarbonate. In another example implementation, the transparent structure may be formed from a glass material, such as a doped glass. For example, the glass may be doped via ion embedding or implantation, where the dose of ions is suitable for obtaining a desired level of refractive index change under irradiation by the irradiating optical beam.

In one embodiment, the induced changes in the refractive index are produced by a local change in the density of the material in response to the irradiating optical beam, provided that a threshold has been exceeded. Such a densification process is typically a multiphoton process and thus allows for the writing of features sizes diameters smaller than the focal spot. This mechanism has been demonstrated to produce optically induced changes in the refractive index on the order of $10^{-2}$ to $10^{-3}$ with a spatial resolution on a micron scale in some materials. In another embodiment, the transparent structure may be formed from a material that is selected to exhibit photorefractive properties.

As described above, the internal optical element is formed such that it is substantially transparent. The level of transparency of the induced internal optical element may be such that an internally propagating incident optical beam is internally directed towards, and optically refracted by, the internal optically element, without encountering substantial optical absorption by the structure.

It is to be understood that the transparent structure may only be transparent over a portion of the optical spectrum. The transparent structure may be transparent to the incident optical beam over at least a portion of one or more regions of the optical spectrum, including the ultraviolet, visible, and infrared spectral regions.

The transparent structure may be provided such that the incident optical beam is optically waveguided within the structure prior to encountering, during encountering and/or after encountering the internal optical element. For example, the transparent structure may include a passive waveguide prior to exposure to the irradiating optical beam, such a fiber optic waveguide defined by suitable core and cladding regions. Alternatively, the transparent structure may be initially free of optically confining structures.

The irradiating optical beam may have one or more properties (for example, a wavelength, intensity and/or fluence) such that the irradiating optical beam is suitable for producing a local change in the density of the structure through a linear or nonlinear optical absorption process, such that the resulting change in the density of the structure produces a corresponding change in refractive index.

In one example implementation, the irradiating optical beam includes one or more laser pulses, where the pulses are ultrafast pulses. The pulse length of the ultrafast pulses may be, for example, in the nanosecond regime, picosecond regime, or femtosecond regime, provided that the pulsewidth is sufficiently short to produce, at the beam focus within the optical structure, a focus spot that exceeds the threshold for the generation of a refractive index change. In some embodiments, the wavelength of the laser pulse may be within the extreme ultraviolet (50-250 nm), visible (400-800 nm) or infrared (800 nm-3 um) spectral range. In another example implementation, the irradiating optical beam may have a wavelength within the x-ray regime.

Suitable parameters of the optical irradiation beam for producing refractive index changes in a wide variety of transparent material include those described in U.S. Pat. No. 6,573,026, (Aitken et al.), U.S. Pat. No. 6,884,960 (Bourne et al.), and U.S. Pat. No. 6,853,785 (Dunn et al.), which are all incorporated herein by reference in their entirety. According to one example implementation, index of refraction changes required to achieve lensing conditions as described herein can be realized with 550 nm laser pulses of 150 fs duration with a writing energy of 1.3 µJ/pulse at a 250 kHz repetition rate, and at a 400 µm/s feed rate and with a beam waist of 1.5 µm into a fused silica plate at a depth of 0.5 mm. One skilled in the art will appreciate that in practicing the embodiments of the present disclosure, only reasonable and routine experimentation will be required to determine suitable parameters of the irradiating optical beam for producing a desired refractive index change in a given material.

In some example implementations, wavelengths used for the irradiating beam may include 532 nm, 790 nm, 1064 nm, 1310 nm and 1550 nm. In some embodiments, pulse duration can vary across a broad range, 30 fs to 500 fs and pulse repetition is typically seen in the range of 1 kHz to 100 MHz. In some embodiments, energy per pulse can range from approximately 0.02 µJ to as approximately 6 µJ. In some embodiments, the feed speed of the sample relative to the irradiating beam can also be varied between approximately 50 µm/s to 1000 µm/s.

Referring now to FIG. 1a, the fabrication of an internal optical element within a transparent structure using an irradiating optical beam is illustrated. As shown in the Figure, irradiating optical beam 54 is directed through an external focusing element, such as objective lens 55, and is focused to an internal focal volume 53 within transparent structure 51. As described above, irradiating optical beam produces a change in the refractive index of transparent structure 51 within the local focal volume 53. In some embodiments, such as those involving processes that produce local densification, the refractive index change within the focal volume may be positive. In other embodiments, such as processes that produce voids or optical filaments, the refractive index change within the focal volume may be negative.

Transparent structure 51 may have one or more curved external surfaces. For example, structure 51 may be an optical fiber. In such a case, the densification pattern shown in FIG. 1a is written along the longitudinal axis of the structure 51. In FIG. 1 b, the transparent structure 51 may be a cylindrical structure, such as an optical fiber. Accordingly, in the case shown in FIG. 1b, the irradiating optical beam 54 is directed through an end-face of the cylindrical structure.

FIG. 1(c) provides a flow chart illustrating an example method for forming an optical element within a transparent structure. In step 210, an optical source is provided for generating an irradiating optical beam, where the irradiating optical beam has a wavelength suitable for transmission within the transparent substrate. In step 220, a suitable refractive index spatial profile for forming the optical element within the transparent substrate is determined. In step 230, a suitable spatially dependent irradiation intensity profile is determined for producing the suitable refractive index spatial profile. This step may be achieved, for example, based on a known relationship between the irradiation beam intensity and the induced change in the refractive index profile, or, for example, based on pre-determined calibration data. In step 240, the irradiating optical beam is focused with a profile sufficient to generate a suitable refractive index change within the transparent substrate. In step 250, the a position and beam profile of the irradiating optical beam is controlled according to the suitable spatially dependent irradiation beam profile, optionally based on a feedback signal, as further described below.

Figure 2:
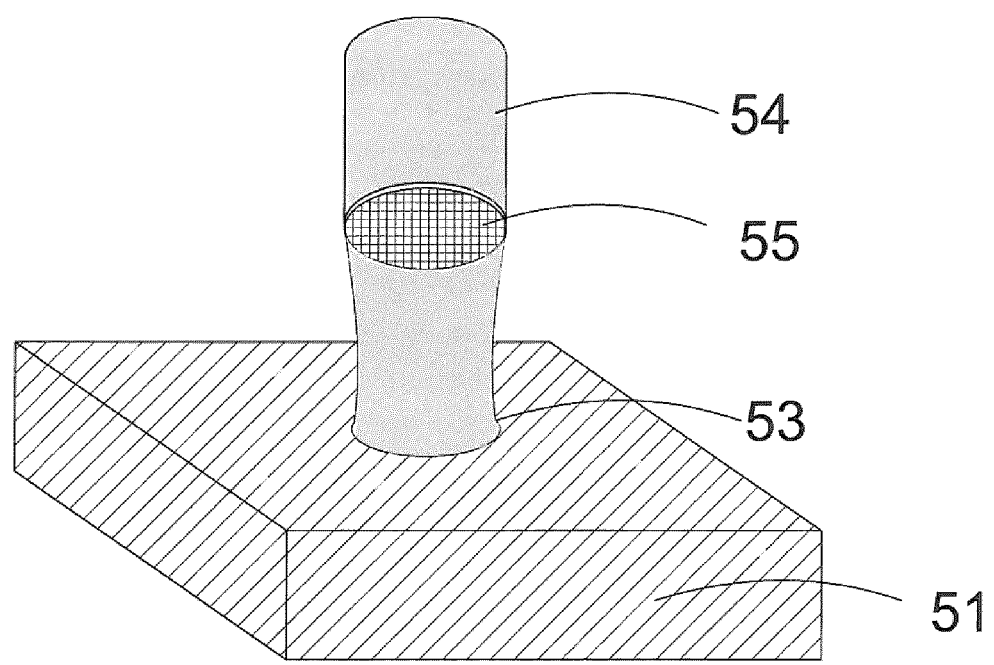
FIG. 2 illustrates method of forming an internal optical element in an optically transparent substrate by directing a focused optical irradiating beam within the substrate.

FIG. 2 illustrates an example method for producing an internal optical element within a transparent structure. In the embodiment shown, irradiating optical beam 54 is focused by lens 55 and is directed into substrate 51, where the focusing is provided such that the focal volume within the substrate is of a size suitable for producing the internal optical element without requiring further relative translation and/or scanning of the irradiating optical beam. Such an embodiment may be employed to generate an internal optical element having a spatially dependent refractive index profile. The focusing lens 55, or another optical focusing or beam shaping element, may be provided to generate a suitable refractive index profile. In one example embodiment, the spatially varying refractive index profile may be generated to provide a gradient index profile over at least a portion of the internal optical element, which may be employed to generate an internal GRIN lens, as further described below. In particular, the intensity roll-off characteristic of the focused irradiating optical beam, and the corresponding roll-off characteristic of the induced refractive index change (for example, due to densification), may be selected to provide a suitable GRIN refractive index profile. It has been reported that densification roll-off characteristics from femtosecond lasers approximate a Gaussian curve. The present method is desired for its simplicity in manufacturing, but requires very specific beam characteristics.

Figure 3:
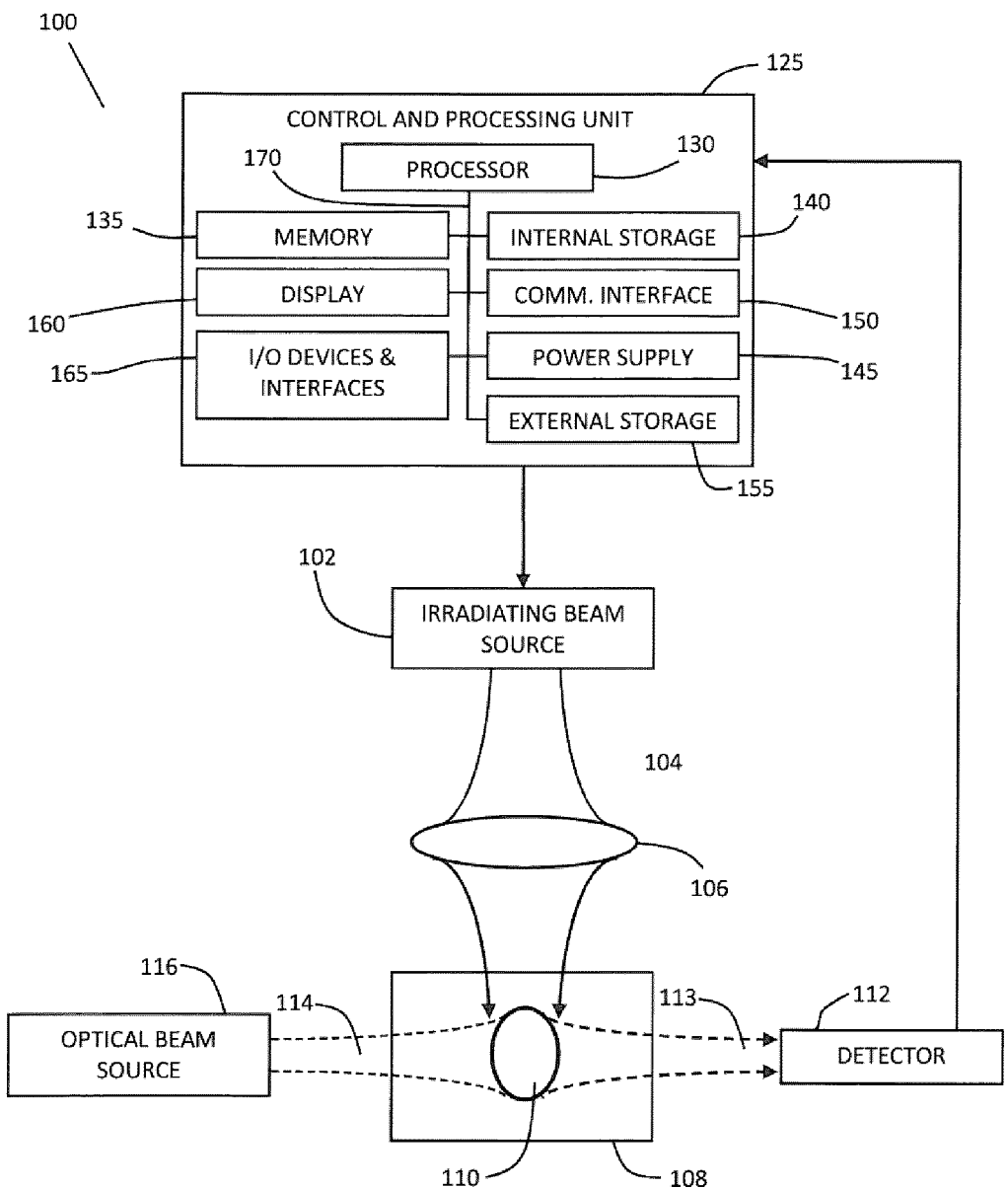
FIG. 3 is a schematic of a system for forming an internal optical element within a transparent structure.

Referring now to FIG. 3, an illustration is provided of an example system 100 for producing an internal optical element within a transparent structure using an irradiating optical beam. System 100 includes irradiating optical beam source 102 for producing irradiating optical beam 104, irradiating optical beam focusing lens 106, and control and processing unit 125, which are employed for irradiating transparent structure 108 and producing internal optical element 110.

Irradiation beam source 102 may be an optical source such as a laser, although it is not necessary for irradiation beam source 102 to emit coherent light. Irradiation beam 104 is directed onto transparent structure 108, where it induces the formation of internal optical element 110 having a different refractive index than that of transparent structure 108.

Internal optical element 110 is shown, by way of example only, as a focusing bulk lens formed from irradiating a volume of the transparent structure. In the presently illustrated example embodiment, internal optical element 110 is formed by focused irradiating optical beam 104 without requiring further positioning of irradiating optical beam 104. As shown in the Figure, internal optical element 110 is formed such that an incident optical beam 114 is focused upon transmission through internal optical element 110.

Control and processing unit 125, which is described in further detail below, is employed for the control of irradiation beam source 102. As shown in the Figure, control and processing unit may provide a feedback signal to irradiation beam source 102 based on a signal detected by detector 112, where the signal is associated with a property of the transmitted optical beam 113, as further described below. Detector 112 may be an array detector for detecting a beam profile. Alternatively, detector 112 may be a single element detector for detecting a local intensity, optionally further including a spatial filter. System 100 may also include optical beam source 116 for producing optical beam 114. Control and processing subsystem 125 may be integrated with one or more of the other subsystems of system 100.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

FIG. 3 (and FIG. 5 below) provides an example implementation of control and processing unit 125, which includes one or more processors 130 (for example, a CPU/microprocessor), bus 170, memory 135, which may include random access memory (RAM) and/or read only memory (ROM), one or more internal storage devices 140 (e.g. a hard disk drive, compact disk drive or internal flash memory), a power supply 145, one more communications interfaces 150, external storage 155, a display 160 and various input/ output devices and/or interfaces 165 (e.g., a receiver, a transmitter, a speaker, a display, an imaging sensor, such as those used in a digital still camera or digital video camera, a clock, an output port, a user input device, such as a keyboard, a keypad, a mouse, a position tracked stylus, a position tracked probe, a foot switch, and/or a microphone for capturing speech commands).

Although only one of each component is illustrated in FIG. 3, any number of each component can be included control and processing unit 100. For example, a computer typically contains a number of different data storage media. Furthermore, although bus 170 is depicted as a single connection between all of the components, it will be appreciated that the bus 170 may represent one or more circuits, devices or communication channels which link two or more of the components. For example, in personal computers, bus 170 often includes or is a motherboard.

In one embodiment, control and processing unit 125 may be, or include, a general purpose computer or any other hardware equivalents. Control and processing unit 125 may also be implemented as one or more physical devices that are coupled to processor 130 through one of more communications channels or interfaces. For example, control and processing unit 125 can be implemented using application specific integrated circuits (ASIC). Alternatively, control and processing unit 125 can be implemented as a combination of hardware and software, where the software is loaded into the processor from the memory or over a network connection.

Control and processing unit 125 may be programmed with a set of instructions which when executed in the processor causes the system to perform one or more methods described in the disclosure. For example, control and processing unit 125 may be programmed to scan the irradiating optical beam 104 within the sample over a controlled scan profile with controlled beam parameters for forming an internal optical element. Control and processing unit 125 may also be programmed to control the parameters of the irradiating optical beam 104 in response to feedback signals received from a detector 112, where the feedback signals are associated with the profile of an optical beam transmitted 114 through the transparent structure 108 during or after the formation of the internal optical element 110. Control and processing unit 125 may include many more or less components than those shown.

Figure 4:
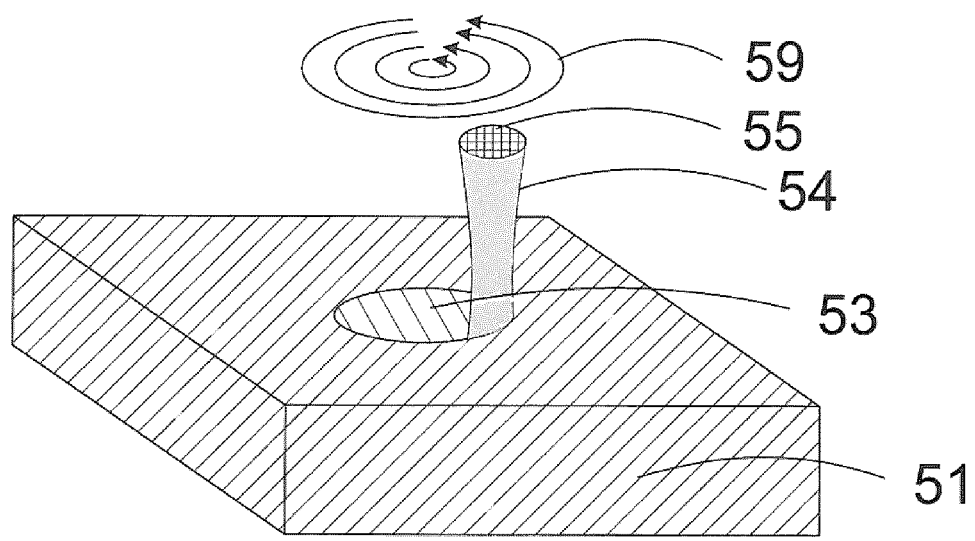
FIG. 4 illustrates method of forming an internal optical element in an optically transparent substrate by scanning a focused irradiation beam within the substrate.

Referring now to FIG. 4, an illustration is provided showing an alternate embodiment in which the irradiating optical beam 54 is scanned within the transparent substrate to generate the internal optical element. As shown in the Figure, the beamwidth of the irradiating optical beam is smaller than the size of the internal optical element. Irradiating optical beam 54 is scanned relative to the optically transparent substrate 51. During scanning, parameters of the irradiating optical beam may be varied in order to produce different local changes in the refractive index. Some examples of the parameters that may be adjusted include: pulse length, pulse power, pulse repetition frequency, optical wavelength, beam width, beam shape, feed rate, and number of passes. These parameters may be varied in response to a feedback signal, as further described below.

The scanning pattern 59 shown in the Figure illustrates an example profile in which irradiating optical beam 54 is scanned in a scanning path defined by concentric circular paths. As noted above, during each pass, one or more of many parameters may be varied to achieve a different index of refraction for that path.

Figure 5:
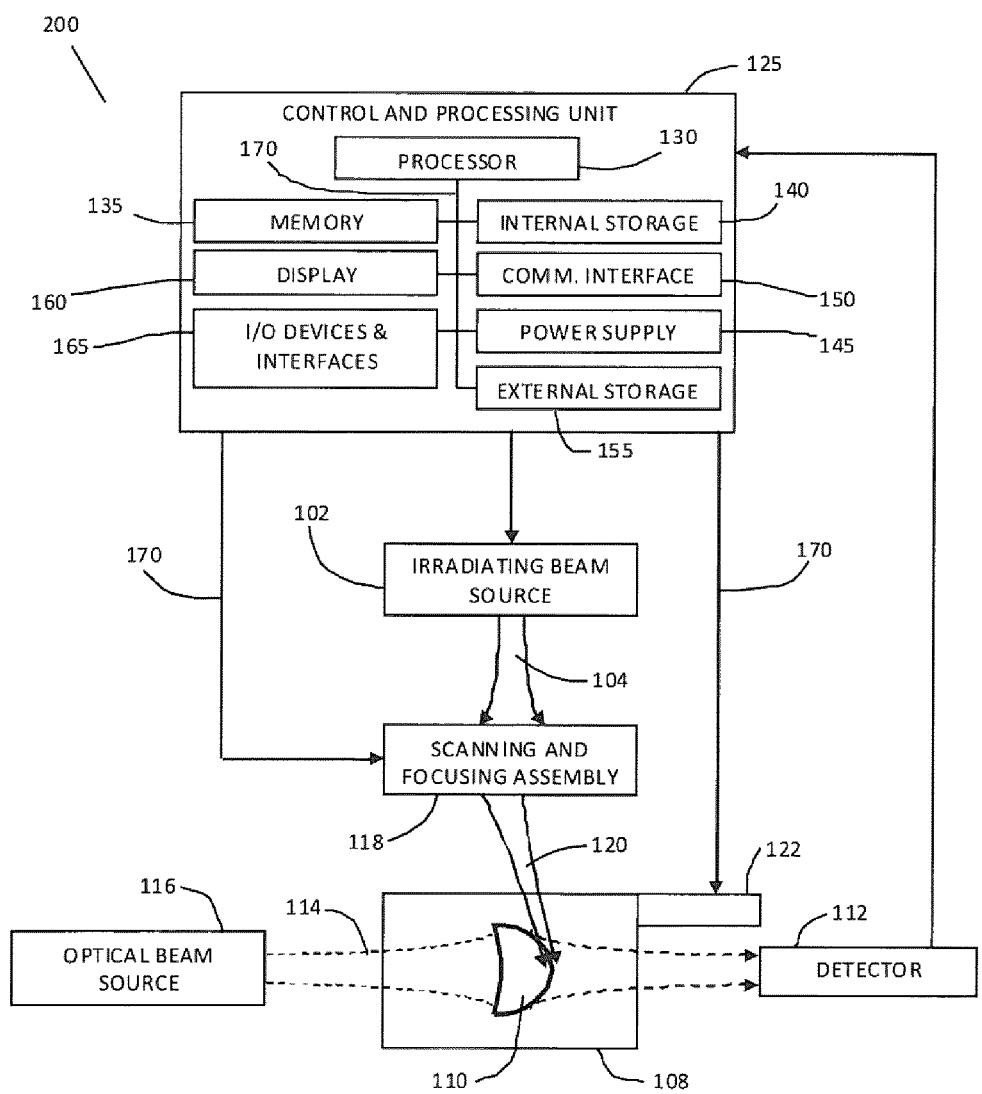
FIG. 5 is a schematic of a system for forming an internal optical element within a structure in which the optical irradiating beam is scanned within the transparent structure.

Referring now to FIG. 5, an illustration is provided of another example system 200 for producing an internal optical element within a transparent structure using an irradiating optical beam. System 200 includes irradiating optical beam source 102 for producing irradiating optical beam 104, scanning and focusing assembly 118 for focusing irradiating optical beam 104 and scanning irradiating optical beam 104, and control and processing unit 125, which are employed for scanning and irradiating transparent structure 108 and producing internal optical element 110. System 200 may further include a translation assembly 122 for translating the position of the transparent structure during scanning, for example, to vary the relative depth of the focused irradiating optical beam 120.

In one embodiment, scanning and focusing assembly 118 may include a two-dimensional galvanometer and a focusing lens (such as a telecentric or f-theta lens) for scanning the focus of the irradiating optical beam 120 in the two-dimensional lateral plane, and translation assembly 122 may include a motorized translation stage for controlling the depth of the beam focus within the transparent structure. In another example implementation, translation assembly 122 may further include, or be replaced by, a rotation assembly, for example, for rotating a cylindrical transparent structure during scanning.

Figure 6:
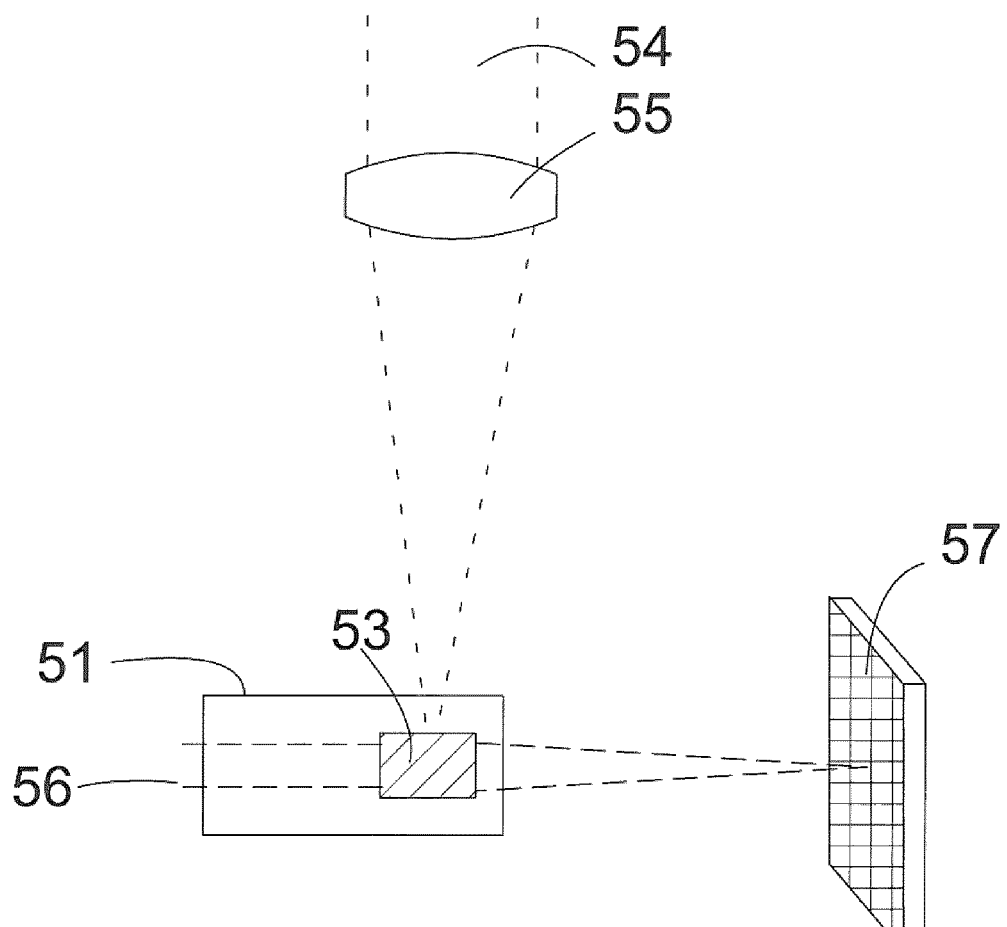
FIG. 6 illustrates a first configuration for writing an optical element in a transparent substrate using a feedback mechanism to control and tune the writing of the optical element.

Referring now to FIG. 6, an illustration is provided of an example method and apparatus for providing a feedback signal during formation of the internal optical element 53. Unlike other feedback-based methods, the present embodiment employs an additional optical beam 56 that propagates internally within substrate 51 and is incident upon internal optical element 53, without inducing refractive index changes within optical element 53. As described further below, in some embodiments, optical element 53 is formed to focus or otherwise influence the propagation of an optical beam propagating internally within substrate 51 and having pre-selected beam parameters, and additional optical beam 56 may be provided having substantially the same beam parameters. Such an embodiment provides feedback that that is directly related to the performance of optical element 53.

A camera or other imaging device 57 (such as a CCD camera, or a commercial beam profiler) is provided to generate a signal associated with the transverse profile of additional optical beam 56 after additional optical beam 56 has been transmitted through the generated optical element 53. Imaging device 57 may be placed at a location corresponding to a desired focal plane of a fully generated internal optical element 53.

The image or beam profile detected by imaging device 57 may be employed to actively control the formation of internal optical element 53. For example, the spatial profile of the transmitted additional beam may be processed (e.g. by control and processing unit 125) in order to detect any potential errors. Control and processing unit 125 may then be used to compare to a feedback signals to previously measured or simulated beam profiles. Alternatively, mathematical models may be derived to determine ideal irradiating parameters based on feedback signals.

In one example implementation, the measured beam profile may be compared with a reference beam profile (e.g. a previously measured or simulated beam profile) in order to infer a deviation between the spatial profile of the refractive index variations formed within substrate 51 and the desired refractive index profile. A spatially dependent error profile, based on, for example, the difference or ratio between the measured beam profile and the reference beam profile, may be calculated. This error profile, or another such comparative measure, may be employed to determine an additional amount of fluence and/or intensity that is delivered to substrate 51.

For example, the error profile may be employed to determine, on a local (e.g. per pixel of imaging device 57) basis, an additional amount of exposure of the optical irradiating beam (e.g., in terms of fluence and/or intensity) that is needed in order to further process substrate 51 such that the measured spatial profile (and hence the refractive index profile) is modified to a correct or suitable level, for example, such that the error profile is reduced. This may be employed to correct for imperfections in a pre-formed optical element.

In one example implementation, only a fraction of the amount of additional exposure is delivered in order to avoid overexposure, and the process is repeated one or more times until a suitable level of convergence is achieved. This embodiment may also be practiced when performing the initial exposure, such that overexposure is avoided in all processing steps.

Figure 7:
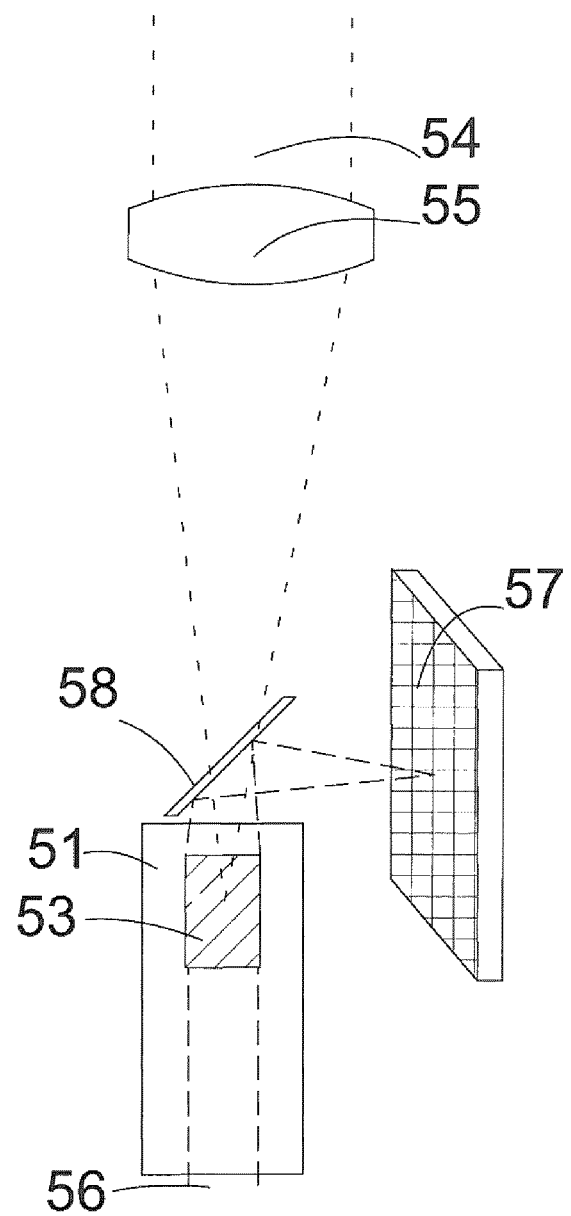
FIG. 7 illustrates a second configuration for writing an optical element in a transparent substrate using a feedback mechanism to control and tune the writing of the optical element.
Figures 8A, 8B:
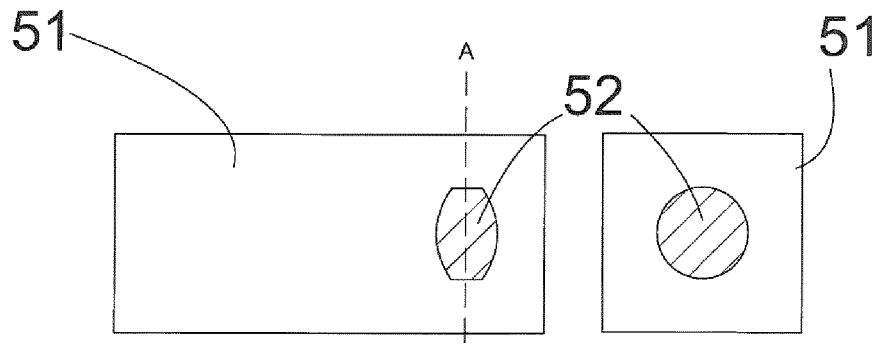
FIGS. 8 (a) and (b) illustrate a double convex optical element fabricated inside a substrate, showing (a) a side view and (b) a cross-sectional view.

FIG. 7 shows another example system, in which irradiation beam 54 is directed through an end face of transparent structure 51 for inducing refractive index changes along the longitudinal direction of transparent structure 51 (for example, along a longitudinal axis of a cylindrical structure, such as an optical fiber). Incident optical beam 56 is directed through at least a portion of transparent structure 56 (which may include an optical waveguide such as a fiber optic core) and is transmitted by optical element 53 and is detected by detector array 57 in order to assess the resulting beam profile after transmission and refraction. The resulting signal is provided to control and processing unit 125 for generating a feedback signal to control parameters of irradiation beam 54, as noted above.

Dichroic mirror 58, or another suitable beam sampling optical element (such as an optical window for generating a Fresnel reflection), is provided between objective lens 55 and optically transparent structure 51. Beam sampling element 58 substantially transmits irradiating optical beam 54, while reflecting at least a portion of optical beam 56 towards detector or imaging device 57 for assessing the beam produced by the lens writing procedure. The dichroic mirror 58 is selected to be predominantly transparent to irradiating optical beam 54 and is located sufficiently remote from the focal point of the irradiating optical beam after passing through lens 55. The imaging information received from optical imaging device 57 can be used as feedback for tuning the internal optical element 53 as it is being written.

In another embodiment, an alternative optical arrangement may be provided in which a dichroic mirror may be employed to reflect, rather than transmit, irradiating optical beam 54, while transmitting, rather than reflecting, optical beam 56. It will be understood that the illustrated feedback embodiments are merely provided as examples, and other suitable optical arrangements may be employed without departing from the scope of the present embodiments.

In other embodiments, the preceding feedback-based embodiments may be employed as a method of tuning, re-working, trimming, or otherwise modifying the refractive index of optical element 53 as a post-processing step. For example, such embodiments may be performed for modifying optical element 53 in order to correct for fabrication errors. In another example implementation, substrate 51 may include a pre-formed optical element that is formed according to another process, such as a conventional lens making process (including, but not limited to, polishing, molding, and embossing), and the preceding feedback-based embodiments may be employed to post-process the pre-formed optical element. For example, optical element 53 may be a gradient index lens that is formed via an ion exchange process, and the post-processing steps may be performed for correcting and/or fine tuning the optical properties or performance of the gradient index lens.

FIGS. 8 to 15 illustrate a non-limited set of optical elements that may be formed within a transparent structure according to various example embodiments provided herein. FIG. 8a illustrates a bulk optical element 52 fabricated inside a substrate 51 according to an embodiment of the present disclosure, where the refractive index of internal optical element 52 is modified relative to the baseline refractive index of substrate 51. Element 52 consists of two convex surfaces such that when an internal incident optical beam is incident on the element, from within the substrate, it is focused to a depth as determined by the curvatures of each side of the feature and the difference between the index of refraction of the irradiated and non-irradiated portions of the substrate. Line A illustrates a cross-section through the substrate (including internal optical element 52) that is portrayed in FIG. 8b.

Figure 9A:
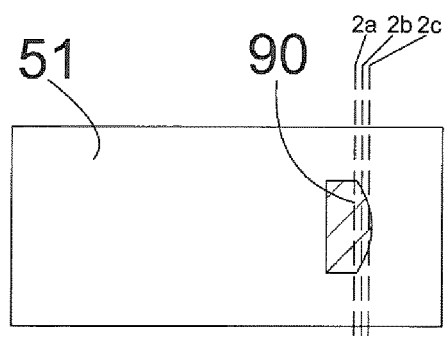
FIG. 9 illustrates a single convex optical element fabricated inside a substrate, showing (a) a side view and (b), (c) and (d) cross-sectional views through sections 2a, 2b and 2c.
Figures 9B, 9C, 9D:
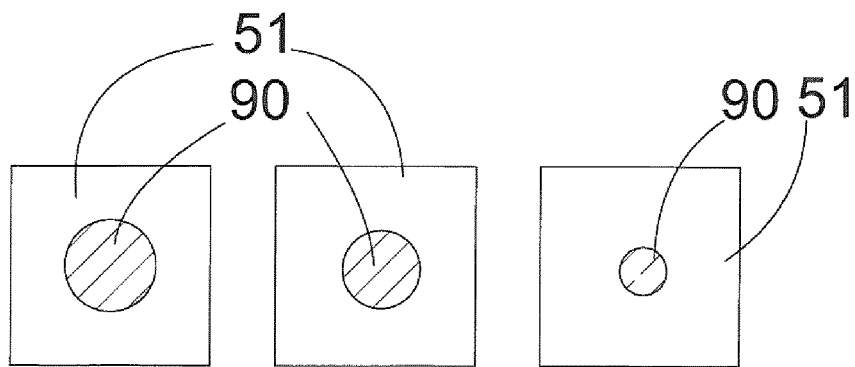
Figure 13A:
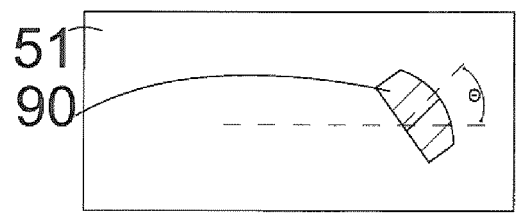
FIGS. 13 (a)-(e) illustrate a series of lenses similar to those from FIGS. 8-13, respectively, with the lenses written at a non-zero angle relative to the longitudinal axis of the optical substrate relative to the optical beam propagation path.
Figure 13B:
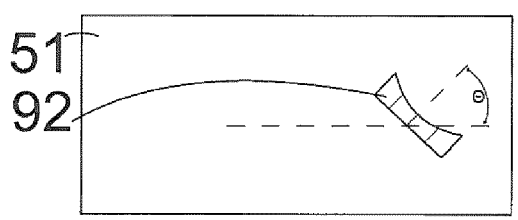
Figure 13C:
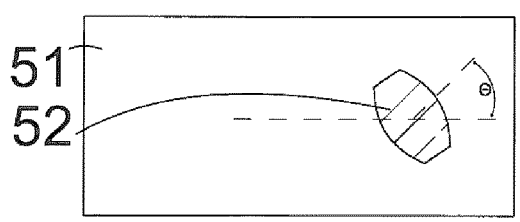
Figure 13D:
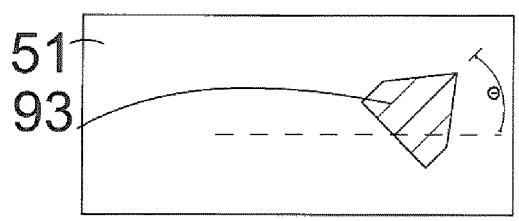
Figure 13E:
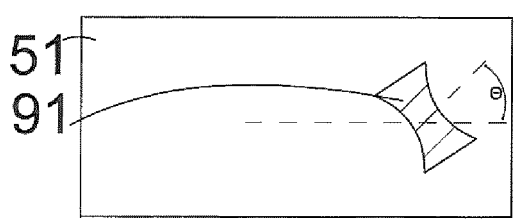

FIG. 9a illustrates an optical element 90 fabricated inside a substrate 51 according to another example embodiment. This element consists of a planar surface formed in the substrate on one side of element along with a curved surface on the other side of the element, thus defining an internal plano-convex lens. Lines 2a, 2b, 2c illustrate cross-sections portrayed in FIGS. 9b, 9c and 9d respectively.

FIG. 10 illustrates an optical element 91 fabricated inside a substrate 51 according to another example embodiment. This element is composed of two concave surfaces formed on each side of the element, thus defining an internal double concave lens. This element is suitable for negatively focusing, or diverging, an incident optical beam propagating within substrate 51, where the focusing or diverging is dependent on the curvature of each of the sides of the structure and the change in index of refraction of between the irradiated and non-irradiated substrate.

FIG. 11 illustrates an optical element 92 fabricated inside a substrate 51 according to another example embodiment. This element is composed of a planar surface on one side and a concave surface on the other, thus defining a plano-concave lens. Similar to the element described in FIG. 10, this element acts to negatively focus, or diverge, an incident optical beam.

FIG. 12a illustrates an optical element 93 fabricated inside a substrate 51 according to another example embodiment. This element is composed of a planar surface on one side and another surface, which is conical in shape. This element defines an internal axicon lens, such that, for example, when an optical beam is incident on the lens from within substrate 51, the lens acts to create a Bessel beam from the incident light. Lines 5a, 5b, and 5c illustrate cross sections that are illustrated in FIGS. 12b, 12c and 12d respectively.

FIGS. 13a-13e illustrate alternative example implementations of the embodiments shown in FIGS. 8-12, where in each example illustration, the internal optical element is shown orientated at an angle θ relative to an axis or surface plane of the substrate.

Figure 14A:
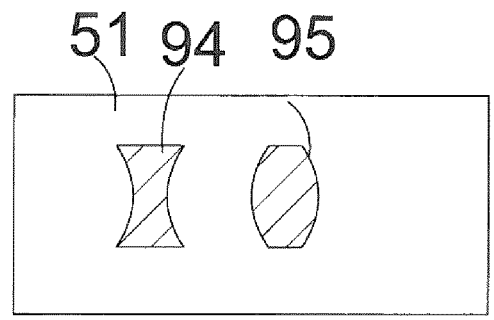
FIGS. 14 (a)-(d) illustrate the development of multiple serial lenses inside a substrate, showing (a) a dual element configuration, (b) a telescopic configuration, (c) a deformable substrate that is optically transparent substrate having formed therein an optical element, and (d) the effect of compression or stretching on the optical element and associated beam propagation.
Figure 14B:
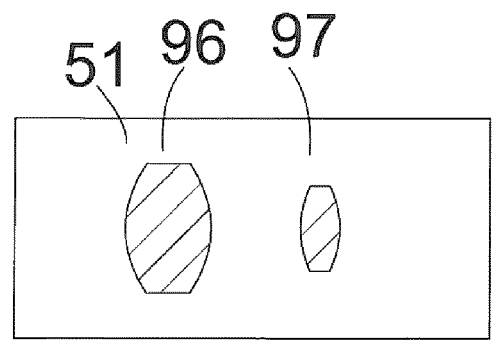

Although the preceding embodiments illustrate a single internal optical element, it is to be understood that two or more internal optical elements may be formed within the transparent substrate or structure. FIG. 14a illustrates a multi-element example implementation in which two optical elements 94 and 95 are fabricated within substrate 51. Similarly, FIG. 14b illustrates another multi-element example implementation in which optical elements 96 and 97 are fabricated within substrate 51. As shown in FIG. 14b, a telescopic configuration is provided where the curvature is differed on each geometric lens.

In one embodiment, the optical element may be internal into a substrate, and the substrate may be subjected to stretching and/or compression to induce optical changes to the internal element. Stretching and/or compression of the substrate results in a change of shape and/or density of the optical element, thereby changing the propagation of light through the optical element.

Figure 14C:
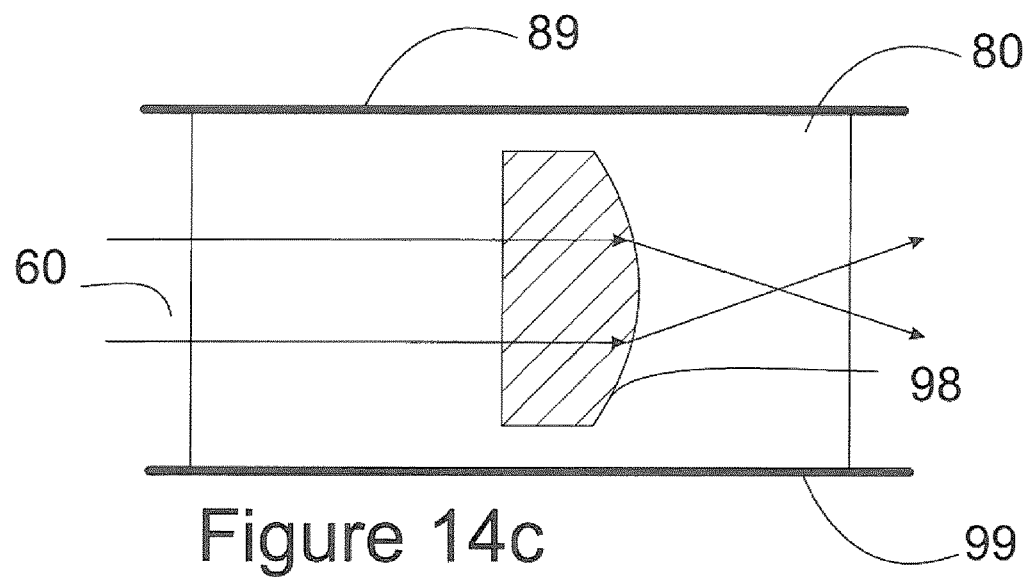

FIG. 14c illustrates an example embodiment in which stretching (expansion) and/or compression are electrically applied via piezoelectric forces. As shown in the Figure, substrate 80 which can be compressed or rarified under electrical or mechanical stimulation is an optically transparent substrate with an internal optical element 98 which, for example, may be of elements 52, 53, 90-97 and 110. A voltage may be applied between the positive electrode 89 and negative electrode 99 to generate an internal electric field and thereby induce compression and/or stretching in the material via piezoelectric forces.

Figure 14D:
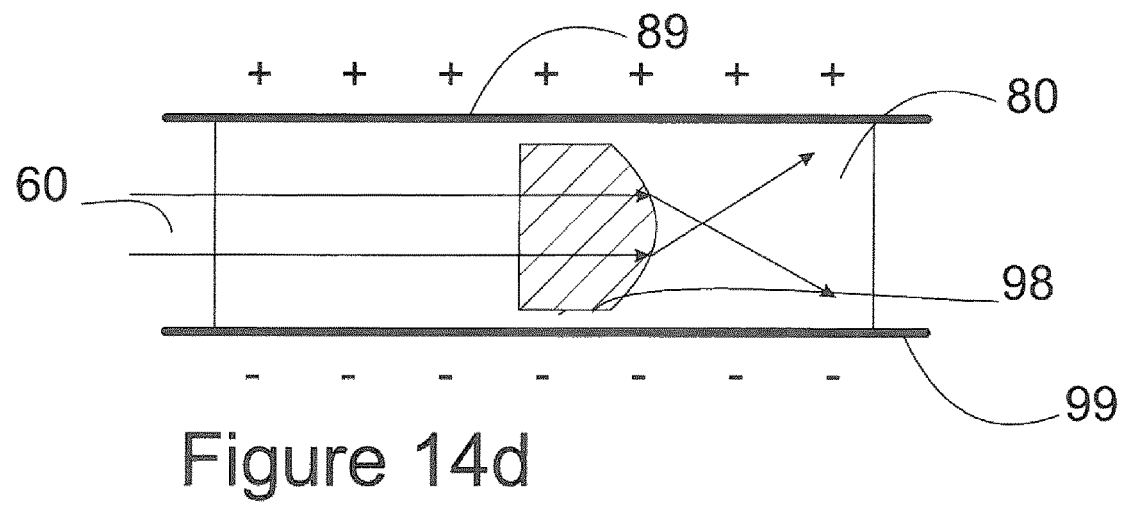

This embodiment allows either a user or system to dynamically change the focusing properties of the lens 98 and therefore dynamically change the focusing of beam. A feedback signal, generated in response to changes in the properties of a beam transmitted through optical element 98, may be employed to actively vary the optical properties of element 98. FIG. 14d illustrates how the substrate 80 and optical element 98 would change during compression or stretching. It should also be noted that the positive and negative electrodes 89 and 99 may additionally or alternatively located on the front and back surfaces that are perpendicular to the incoming beam 60 (for example, via the application of transparent conductive electrodes).

Figure 15A:
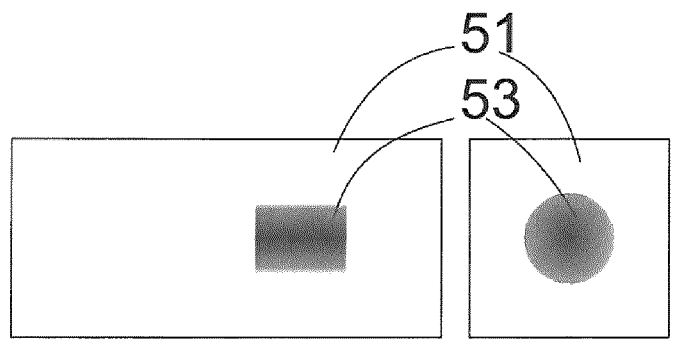
FIGS. 15 (a) and (b) illustrate (a) a GRIN lens element fabricated inside a substrate and (b) a typical GRIN refractive index profile.

FIG. 15a illustrates an optical element 53 fabricated inside a substrate 51 according to another example embodiment. As illustrated in the drawing, a gradient index (GRIN) lens is formed by spatially varying the density of the transparent in a graded fashion. The induced GRIN lens 53 acts to focus an incident beam. Here, optically transparent substrate 51 is optically irradiated to form an optical element 53 with a variable refractive index pattern.

This pattern can be produced in a number of different ways, as discussed above. For example when forming a lens within a cylindrical substrate, the GRIN pattern may be formed by interrogating the optical substrate end face and scanning using a trepanning or spiral pattern described in FIG. 4, while adjusting the irradiating optical beam properties according to the desired gradient (i.e. one may increase the intensity of the irradiating optical beam gradually the center of the desired lens is approached). Alternatively, a constant beam profile may be used, and areas of increased desired density may be irradiated with greater frequency. In these example cases, it is assumed that the depth of field of the irradiating optical beam is sufficiently deep such that index changes are constant with depth throughout the desired thickness of the lens. Yet another alternative approach is to use an optical irradiating beam that has a very short depth of field and irradiating the substrate radially. In this case, either the laser source, or more preferably, the substrate may be rotated during irradiation. The focal depth and beam parameters are modified to create an index gradient with respect to the depth within the substrate, creating a gradient index shift from the outermost regions to the innermost regions. An example profile of the change in refractive index 62 due to the influence of the irradiating optical beam 54 is shown in FIG. 15b.

Figure 15B:
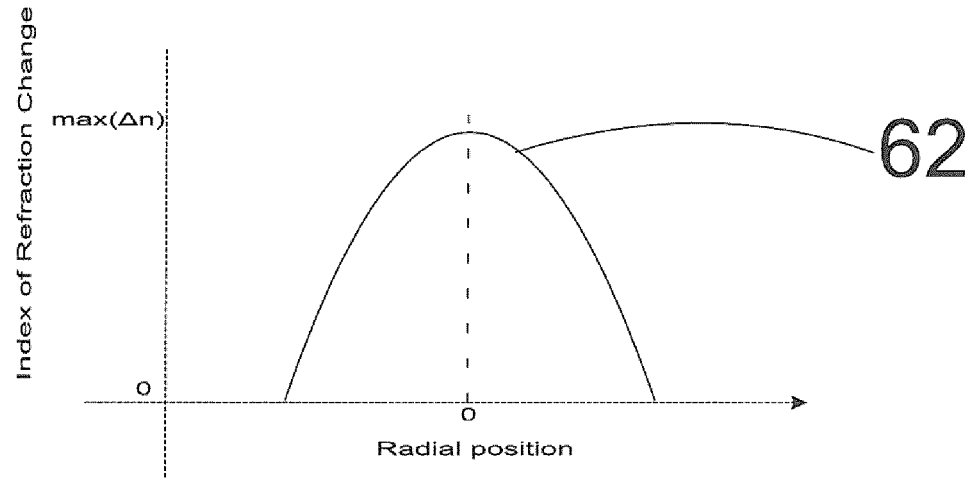

As shown in FIG. 15b, the index of refraction of the formed GRIN lens is highest at the center. As distance from the center of the lens increases radially outward, the index of refraction has a gradient change from high to low. A typical gradient profile from the center of the lens can be calculated based on the following formula:

$$N(r) = N_o\left[1 - \frac{k}{2}r^2\right],$$

where $N_o$ is the base index of refraction at the center of the lens, k is the gradient constant (conventional gradient constants are in the 0-5.5 mm$^{-1}$ range) and r is the distance from the center of the lens measured in millimeters. For example, an index of refraction at the center for a GRIN lens may be in the range of 1.4715 and can decrease down to ~1.4570. Because of the gradient in the index of refraction, the light propagates in a sinusoidal fashion where one full sinusoidal path (2 π) is known as 1 pitch, and the physical pitch length (p) is determined by:

$$p = \frac{2\pi}{\sqrt{k}}.$$

Figure 16A:
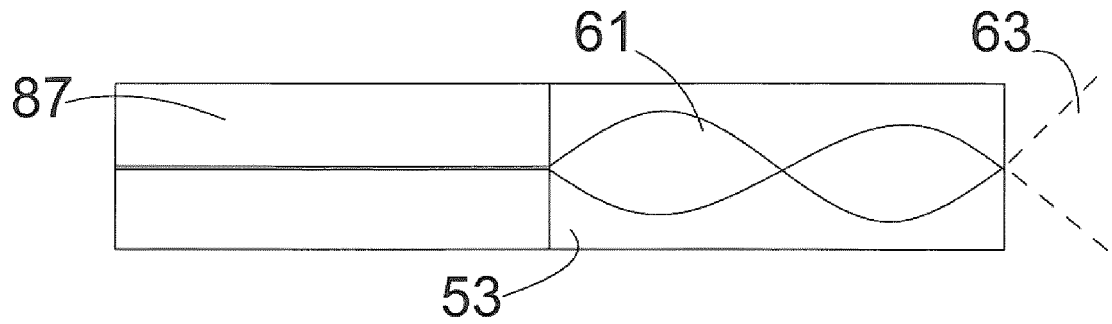
FIGS. 16 (a) to (d) illustrate how different pitch lengths in GRIN lenses can affect the numerical aperture, where (a) and (b) show GRIN lenses with lengths of 1 pitch and ¼pitch, respectively, and where (c) and (d) show GRIN lenses with lengths between ¼ and ½ pitch lengths and the corresponding changes in numerical aperture.
Figure 16B:
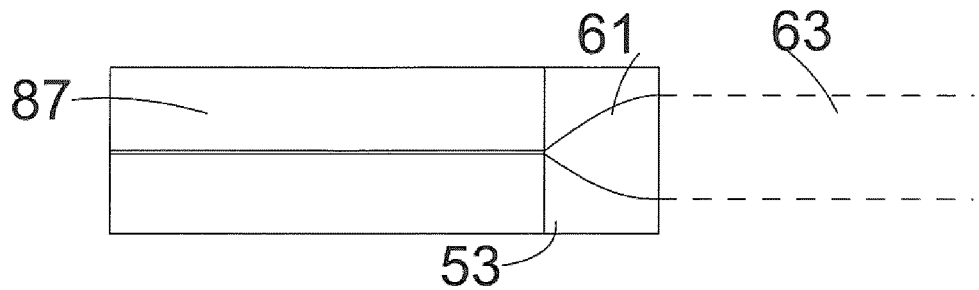
Figure 16C:
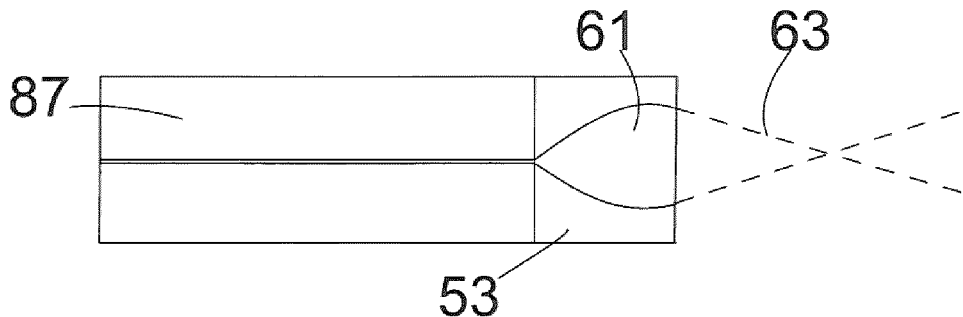
Figure 16D:
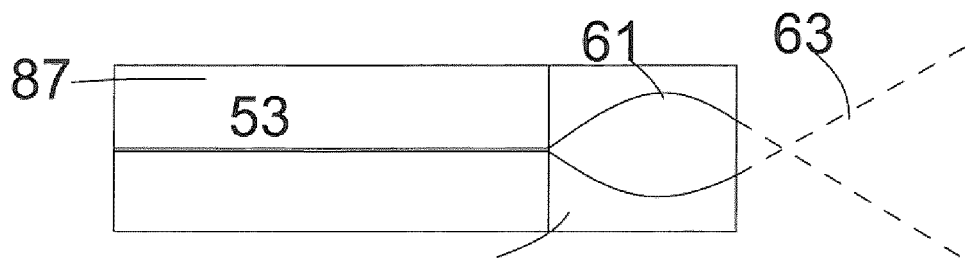

Because of the sinusoidal path, if the GRIN lens were to be varied to different lengths, this would cause the propagating light beams to exit the gradient medium at different angles causing changes in how the light will be focused. FIG. 16a shows an optical waveguide 87 coupled to a GRIN lens, 53, that is exactly 1 pitch in length. Beam path 61 shows the sinusoidal beam within the lens while external beam path 63 demonstrates how the beam propagates once it exits the gradient medium. FIG. 16b shows GRIN lens length of ¼ pitch, causing 63 to be collimated. FIGS. 16c and 16d exhibits how the numerical aperture of the lens is affected by varying the lens length. A well-defined numerical aperture of the lens can be achieved by designing an exact fractional pitch length.

In one embodiment, the transparent structure may be or include an optically transparent acoustically active material. Non-limiting examples of optically transparent acoustically active material may be PVDF, lithium niobate, and single crystal piezoelectrics such as PMN-PT, PZN-PT or PNN-PT. Such materials may be modified to enhance their photosensitivity and/or to increase the change in refractive index that is generated under irradiation by the irradiating optical beam. For example, a lithium niobate crystal may be ion doped to increase a photorefractive effect within the crystal.

In one embodiment, an internal optical element is formed within an optically transparent and acoustically active material, such as that of an ultrasound transducer, such that the acoustically active material may be employed both for the generation and/or detection of ultrasound radiation, and also for the transmission and collection of an optical beam. Example materials having suitable optically transparency within the visible spectrum and/or the near infrared spectrum include PVDF, lithium niobate, single crystal piezoelectric materials such as PMN-PT, PZN-PT or PNN-PT An example of such an embodiment is provided in FIG. 17 a-c, where an optical irradiation beam is employed to produce an internal optical element 83 within an optically transparent and acoustically active material 80 via optically induced refractive index changes.

Figure 17A:
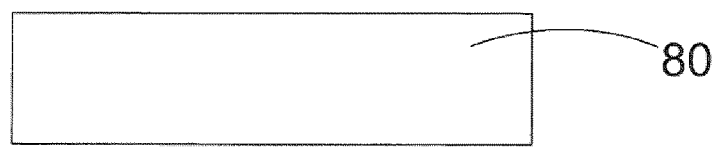
FIGS. 17 (a)-(e) illustrate the formation of a lens in an optically transparent acoustically active structure or device, showing (a) the optically transparent acoustically active structure, (b) the optically transparent acoustically active structure after the formation of a lens, (c) the use of acoustic feedback, (d) the combined use of acoustic and optical feedback, and (e) the attachment of the optically transparent acoustically active structure to a backing material and an optical waveguide and beam director.
Figure 17B:
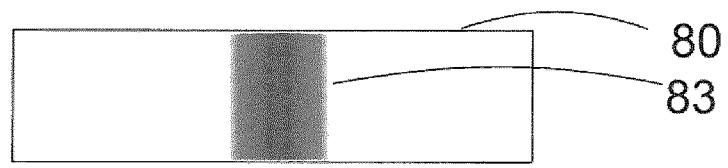

FIG. 17*a* shows a side view of an acoustically active material disc 80 prior to optical irradiation. An internal optical element 83, such as a lens (for example, a GRIN lens) is then directly and optically formed in disc 80 according to the aforementioned embodiments. FIG. 17*b* illustrates the acoustically active disc 80 after irradiation, including internal optical element 83.

Without intending to be limited by theory, it is believed that the refractive index change produced within the acoustically active substrate may arise from one or more of several possible mechanisms. Some mechanism may be temporary, while others may be long-term or permanent. In some embodiments, the irradiating optical beam is configured to produce permanent refractive index changes.

The specific beam parameters for processing a given transparent acoustically active material will vary depending on the material. In one example embodiment, suitable beam parameters may be determined, for example, by focusing an optical irradiating beam within the transparent acoustically active material and varying the beam parameters (for example, varying the beam parameters among the ranges provided and/or referenced above) and inferring the induced refractive index change and its dependence on the beam parameters. The refractive index may be measured, for example, via elipsometry, and/or the refractive index may be indirectly assessed by measuring the transmission and/or deflection of a beam transmitted through optical element. The beam parameters may be varied in order to obtain a suitable modified refractive index.

Additionally, in one embodiment, the optical beam parameters may be selected according to a constraint that one or more acoustic properties of the acoustically active material remain substantial constant, or change within a pre-determined interval, or below a pre-determined threshold. For example, the optical beam parameters may be selected such that a crystal phase within the irradiated region of the transparent acoustically active material remains constant. According to another example, the beam parameters may be selected such that a resonance frequency changes by less than a preselected threshold. In yet another example, the beam parameters may be selected such that an amplitude of ultrasound waves generated in response to a given excitation waveform exceeds a pre-selected threshold. In still another embodiment, the beam parameters may be selected such that the ultrasound transducer is capable of receiving reflected ultrasound waves with a minimum signal to noise ratio. In another example, the beam parameters may be selected such that the directivity of the ultrasound transducer satisfies a pre-determined criterion. Such embodiments allow the use of a substantial portion of the acoustic aperture for ultrasound generation and/or detection while allowing passage of an optical imaging signal through the formed optical element.

In another example implementation, the beam parameters may be selected such that the crystalline phase of the transparent acoustically active material changes from piezoelectric to non-piezoelectric, such that the irradiated zone no longer plays a role in the generation of ultrasound waves.

As noted above, and as shown in FIGS. 6 and 7, the optical element 53 may be formed while monitoring performance of an additional optical beam. In embodiments in which the optical element is formed within a transparent acoustically active material, various additional methods of online monitoring are also possible.

Figure 17C:
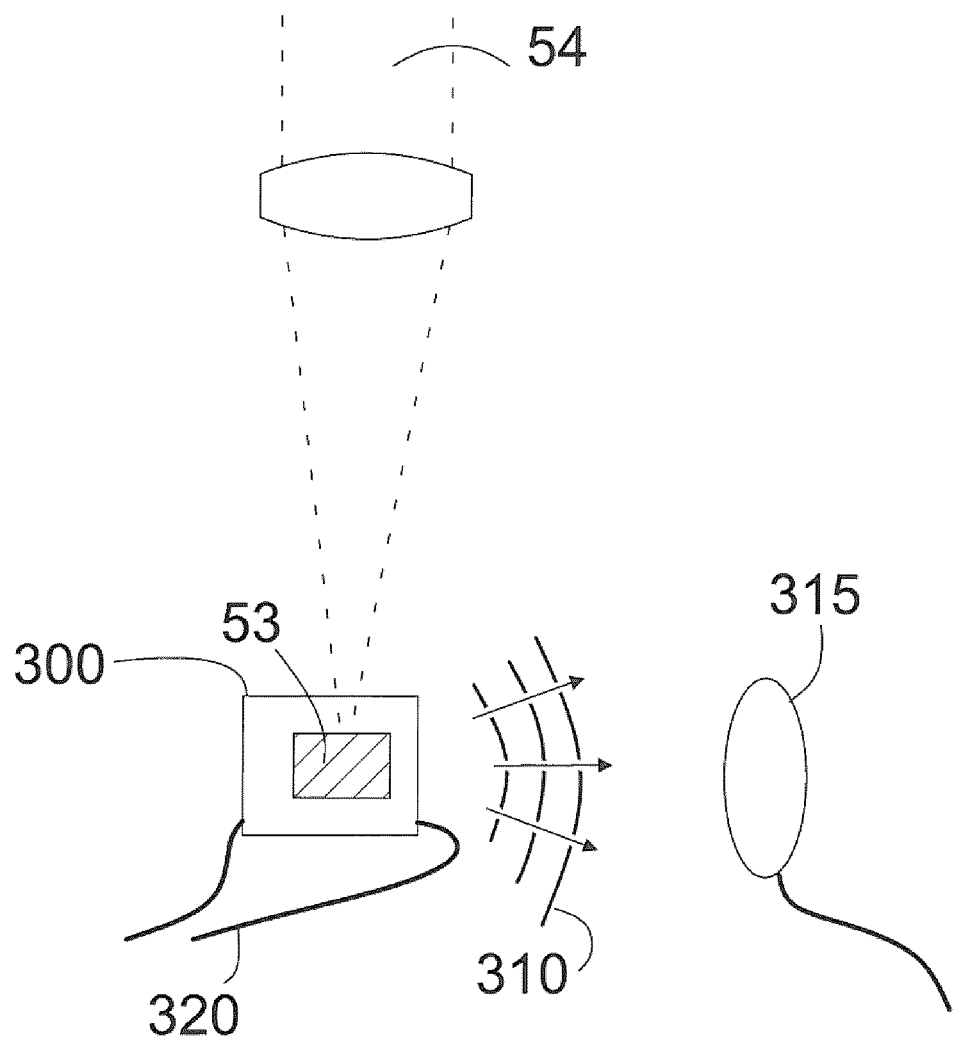

In one example embodiment, one or more acoustic signals and/or properties of the acoustically active material are measured and monitored during formation of optical element 53. Such an embodiment is shown in FIG. 17*c*, in which transparent acoustically active material 300 is irradiated by optical beam 54 to form internal optical element 53. Acoustically active material 300 is electrically excited via wires 320, resulting in the emission of acoustic waves 310. The emitted acoustic waves 310 are received and detected by acoustic detector 315. In other embodiments, an acoustic reflector may reflect the emitted acoustic waves back to acoustically active material 300 for direct detection (e.g. temporally multiplexed acoustic excitation and detection).

Figure 17D:
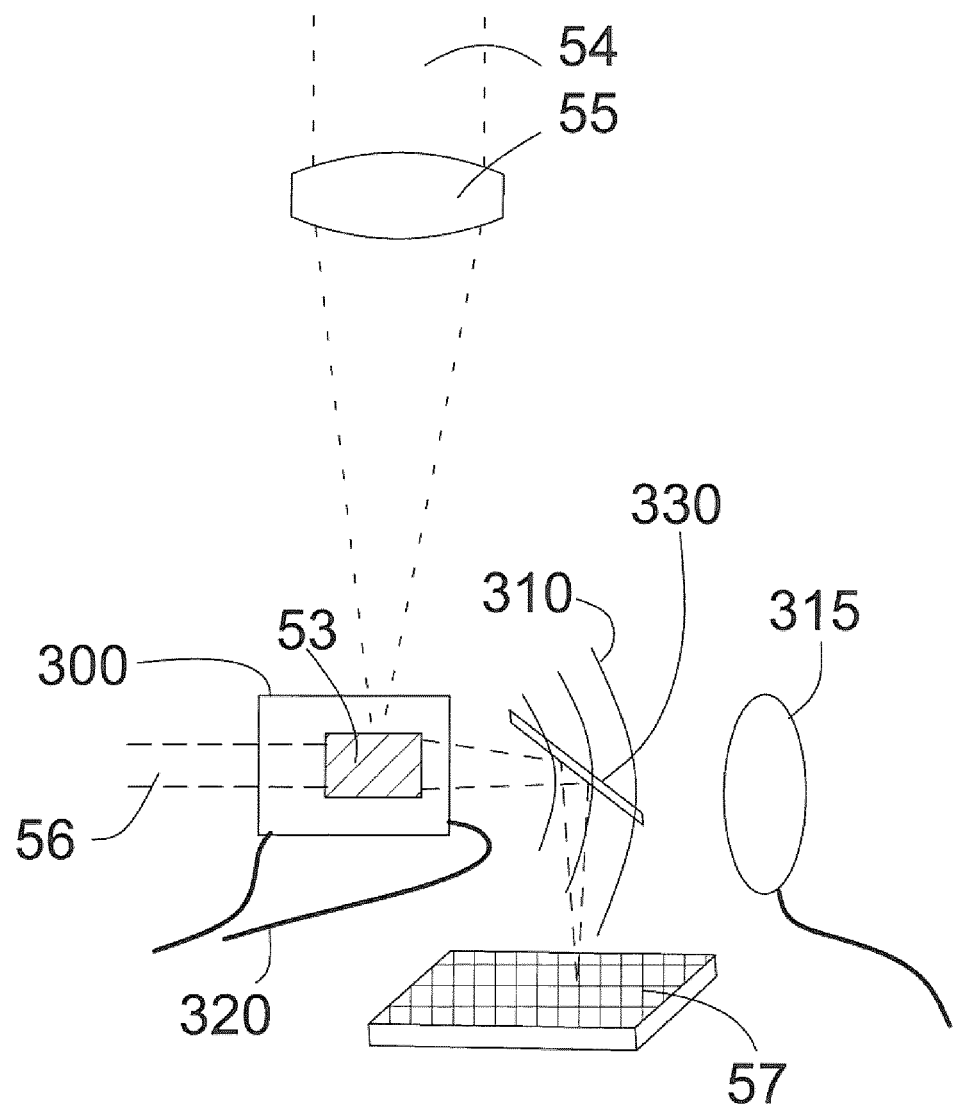

FIG. 17*d* shows an embodiment in which both acoustic and optical monitoring are performed (for example, serially or in parallel) while forming optical element 53. Beam redirection element 330 (e.g. a mirror, beam pick-off, or dichroic beamsplitter) directs additional optical beam 56 onto imaging device 57, as described above, while acoustic waves 310 transmitted by ream redirection element 330 are detected by acoustic detector 315.

The detected signal associated with the acoustic waves may be compared with a reference signal (e.g. a previously measured or simulated signal) in order to infer a deviation between the acoustic properties of the processed material and the initial acoustic properties. If such a deviation is detected, for example, a deviation beyond a given threshold, an action may be taken, such as the termination of the process, or a change in one or more parameters of optical irradiation beam 54. As noted above, the acoustic properties that may be inferred from the detected acoustic signal include a crystal phase, resonance frequency, signal to noise ratio, and directivity.

As shown in FIG. 17*c*, acoustically active material 80 with internal optical element 83 can be assembled with one or more additional optical elements or components, such that the internal optical element is in optical communication with at least one of the one or more additional optical elements. For example, the acoustically active material may be interfaced with an optical waveguide, such as an optical fiber, such that a focal plane of internal optical element 83 is positioned to align with the entrance or exit aperture of the waveguide. Other example optical elements for integration with the internal optical element include light-bending or reflective elements such as prisms, mirrors, gratings or an additional conventional lens. Alternatively a combination of optical elements produced in the manner described in this disclosure may be used in sequence either contained in an entire substrate or in separate individual substrates.

The acoustically active material 80 may be attached to an optical device or component including an optical waveguide, such as an optical fiber, which may be a single mode fiber. The optical waveguide may also be formed via the irradiating optical beam, and the combination of the internal optical element and optical waveguide may be formed in a composite and/or monolithic structure.

FIG. 17*e* illustrates an example embodiment in which acoustically active material 80 with internal optical element 83 is interfaced with an acoustic backing material 86 and an optical waveguide 87 (for example, a fiber optic). In the Figure, optical waveguide 87 is shown as interfacing with optical element 83 through a beam deflecting element 88.

The acoustically active substrate may include a piezoelectric element with electrodes covering the two opposing faces of the piezoelectric element. The direction of acoustic energy propagation is normal to the plate of the electrodes. The electrodes used to electrically interrogate or excite the acoustically active material may be formed from optically transparent electrode materials such as aluminum zinc oxide. Alternatively, in embodiments where the region an optical refractive element is to be formed within the acoustic substrate is not constrained to be acoustically active, the electrodes do not need to cover the region, and hence do not need to be optically transparent. In these cases, the acoustic substrate may be processed to remove the electrodes in the region using various processing techniques including laser machining/ablation, chemical etching, masking, etc. Typical electrode materials not constrained to optical transparency used may include gold, chrome-gold, silver, aluminum, among others. These may be deposited using manual application with epoxies or conductive inks, sputtering, e-beam deposition, evaporators, among others.

At least one acoustic matching layer 81 may be added to improve acoustic beam properties such as bandwidth. These layers typically have acoustic impedances ranging preferably in the range between 2-12 for piezoelectrics such as ceramics and single crystal elements, and are in this case preferably formed from optically transparent materials such as quartz glass, polymers such as parylene, nylon, transparent epoxies such as Epo-tek 301 or Araldite etc. In one embodiment, optical element 83 formed within the acoustically active material 80 is a GRIN lens (as shown in FIGS. 17 *b* and *d*). GRIN lenses that are commonly used in imaging systems typically involve changes in refractive index between of $10^{-3}$ to $10^{-1}$ between the center of the lens and the outer-most region. Typical thicknesses of lenses are between of 30 and 300 um, with lens diameters between 50 and 500 um. When coupled with a coreless spacer the working distances and depth of field are often between 200 um-10 mm, with spot sizes being as small as 28 um. The thickness for generating an imaging transducer are typically between 30 and 500 um in PMN-PT, which is similar to the depth of a usable GRIN lens, as noted above. Accordingly, as described above, both the GRIN lens and the acoustic transducer may be integrated within a single optically transparent and acoustically active material.

Figure 18A:
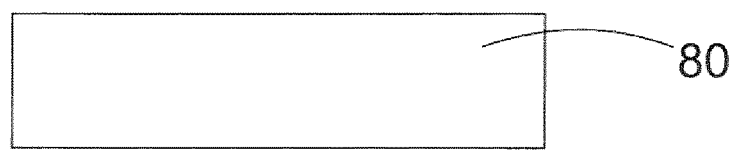
FIGS. 18 (a)-(c) provide another embodiment illustrating the formation of a lens in an optically transparent acoustically active structure or device showing (a) the optically transparent acoustically active structure, (b) the optically transparent acoustically active structure after the formation of a lens, and (c) the attachment of the optically transparent acoustically active structure to a backing material and an optical waveguide.
Figure 18B:
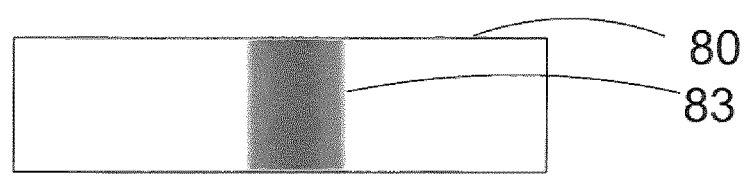
Figure 18C:
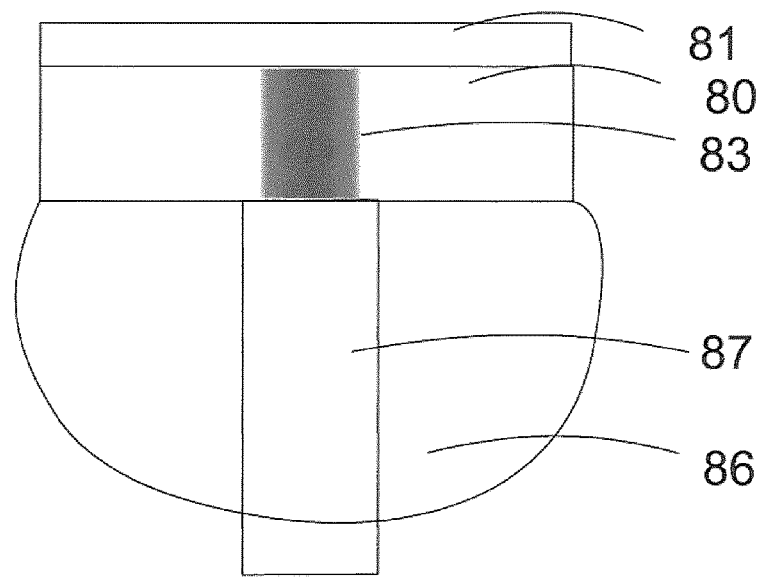

In another embodiment, shown in FIGS. 18*a-c*, the optical waveguide may be interfaced with the acoustically active material such that a longitudinal axis of the optical waveguide is parallel to an axis of acoustic beam generated by the acoustic transducer.

It is to be understood that the internal optical element may be formed prior to, or after, assembly of one or more optical components. In one embodiment, the formation of the internal optical element can be performed and tuned in situ during or following assembly using techniques such as those shown in FIGS. 6 and 7, and 17*b* and 17*c*.

Figure 19A:
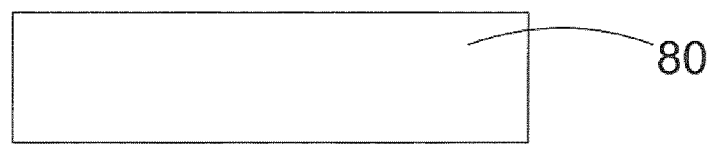
FIGS. 19 (a) to (c) show the optically transparent acoustically active structure assembled as an acoustic transducer combined with an optical system prior to the formation of a lens within the acoustically active structure.
Figure 19B:
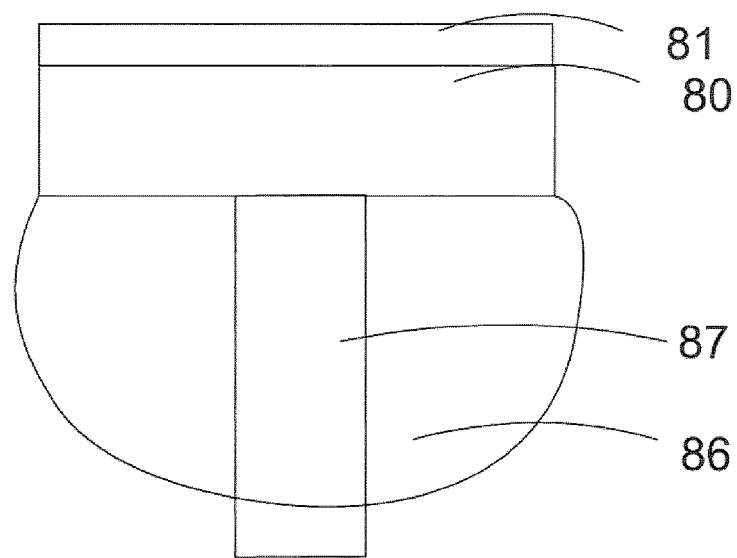
Figure 19C:
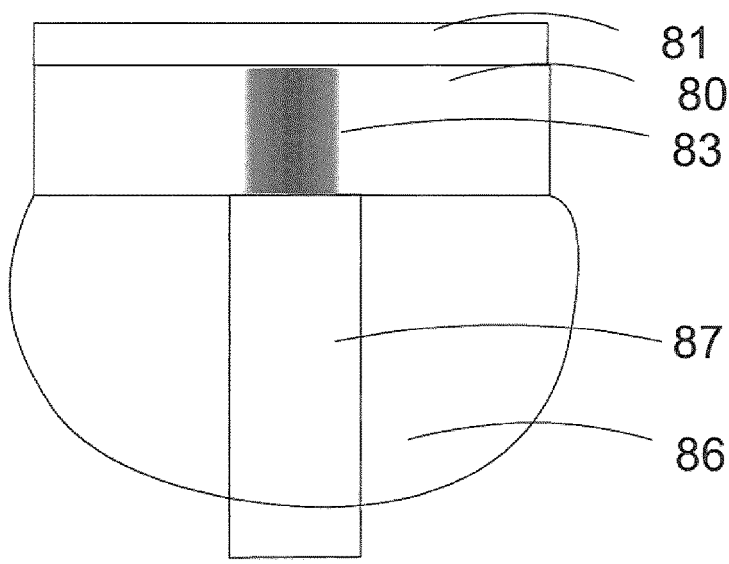

FIG. 19 shows an embodiment in which the opto-acoustic assembly is arranged prior to the formation of an internal optical structure within an optically transparent acoustically active structure. FIG. 19*a* shows the acoustically active substrate 80. This substrate is then assembled/attached with a combination of acoustic elements, such one or more matching layers 80, and a backing layer 87 (and electrodes). In this embodiment, an optical waveguide 87, which may be an optical fiber, is assembled into the backing layer 87 to be in optical communication with optically transparent acoustic substrate 80, and subsequently, optically transparent matching layer 81.

Optical refractive element 83 is then formed using techniques previously described herein into optically transparent acoustically active substrate 83. This may be preferentially done using feedback methods, such as those described in FIG. 6, FIG. 7, 17*b* and/or 17*c*. Such an embodiment may be employed within a combined optical-ultrasound imaging system, which may include an optical lens internal with an ultrasound imaging system, such as that described in U.S. patent application Ser. No. 12/010,208, filed by Courtney et al., and titled "Imaging Probe with Combined Ultrasound and Optical Means of Imaging", which is incorporated herein by reference in it its entirety.

In some cases, it may be beneficial or advantageous to form and/or tune refractive elements in situ following an assembly procedure. The assembly process of an optical system—particularly miniaturized optical systems can introduce significant problems, such as alignment errors, into the optical path. For example, in a combined intravascular ultrasound/optical coherence tomography system as described in Courtney et al. (referenced above), an optical element may be placed within an acoustically active component. In such an embodiment, the imaging probes are typically constrained to diameters of 0.7-5 mm. This optical system may include elements including, but not limited to an optic waveguide such as a fiber optic, optical spacer(s), mirror(s), lens(es), etc. Several embodiments include the formation of a hole within the acoustically active substrate in which at least a portion of the optical system can be embedded (for example, into a recess) to allow the delivery of optical energy (such as imaging energy) and to emit the optical energy from a surface co-aligned with the acoustic emitting face, for the purpose of registering images generated using acoustic energy and those generated using optical energy, as well as for generating images using techniques including photoacoustics or sonoluminescence.

FIG. 20 illustrates an example implementation of such an embodiment. Acoustic substrate 202, which need not be optically transparent, is provided. Suitable acoustic substrates include materials such as PZT, PZT-5H, lithium niobate, composite devices, PVDF, single crystal piezoelectrics, BiNaTiO, and numerous others known in the art. The acoustic substrate is processed to form a physical void, via, recess, or hole 204, which has a diameter suitable for embedding one or more optical elements, as shown in FIG. 20*b*.

Hole 204 can be formed by mechanical drilling, milling, laser machining, etching, or other known processes. Alternatively, the piezoelectric substrate can be formed around the optical element or a mandrel using film deposition techniques, casting, molding, or other processes known in the art.

Figure 20A:
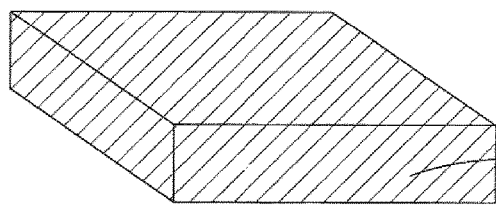
FIGS. 20 (a) to (d) show the placement of an optical assembly within an acoustically active structure and the formation of a lens in situ.
Figure 20B:
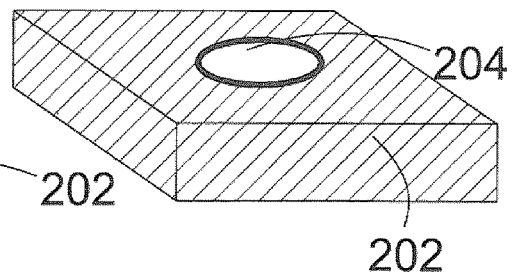
Figure 20C:
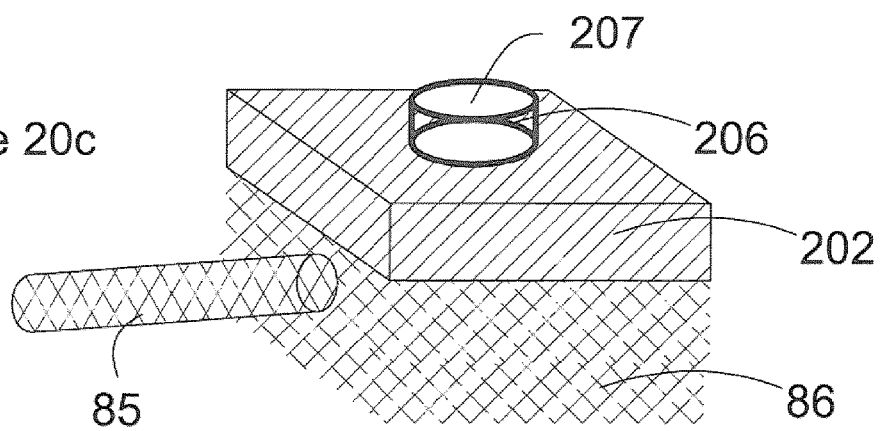
Figure 20D:
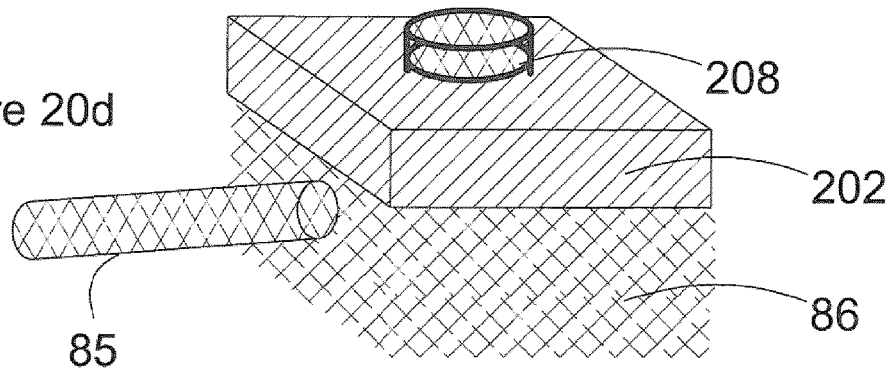

FIG. 20*c* shows the product of a combined optical-acoustic structure where optical waveguide 85, which may be an optical fiber, is embedded into the backing 86 of the transducer, while at least a portion of optical component 206 is embedded within the hole 204 of the transducer (the figure shows an example case in which a portion of optical component 206 is embedded in acoustic substrate 202, while another portion protrudes from the surface of acoustic substrate 202. There may optionally be components such as mirrors or optical spacers (not shown) embedded either within the backing 86 or hole 204 that are used to direct the optical energy from the waveguide 85 into optical element 206.

In one embodiment, optical component 206 may be initially substantially free of refractive features (e.g. a cylindrical optical blank), and which may be processed in-situ in order to form an internal optical component according to the processing methods described above. One or more surfaces of optical component 206, other than a top surface through which optical irradiating beam enters component 206, may be coated with a material suitable for prohibiting the propagation of the irradiating optical beam into another region of the device, such as within backing layer 86. Suitable coatings include metallic coatings and dielectric coatings. In the case of a metallic coating, an aperture of via should be present to allow passage of light from waveguide 85. In the case of a dielectric coating, the dielectric coating may be reflective over a small wavelength that is suitable for reflecting the optical irradiation beam.

In another embodiment, optical component 206 may be a refractive optical component. The process of assembling such a system may require numerous process steps including curing of adhesives or epoxies using thermal cycles (including heating and/or cooling cycles), pressure, energy deposition (i.e. UV energy, electrical energy). These processes may uncontrollably induce undesired alterations to the optical properties and/or alignment of optical structures in the optical path. In order to compensate for these alterations, it may be desirable to create or tune the refractive properties of the refractive optical element 206 into tuned refractive element 208 shown in FIG. 20*d*.

The processes for inducing changes in the refractive index in optical substrates as described herein allow for the ability to perform the creation or tuning of refractive optical elements in situ. These elements can be formed using known parameters under open loop control, or they can alternatively be formed using feedback of refractive properties as described in FIGS. 6, FIG. 7, 17*b* and/or 17*c*.

In another embodiment, one or more hollow features may be produced in the substrate. Such features generate local refractive index changes on the order of unity. For example, the irradiation beam may be selected to cause depth patterning such that the material is removed rather than densified, such as by producing internal voids within the transparent structure.

The embodiments described herein may be employed for a wide variety of applications. For example, the preceding embodiments involving an internal optical feature within a transparent structure may be includes in devices such as optical communications device, a camera, optical imaging catheters such as an endoscope, and a fiber optic probe.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore, what is claimed is:

1. A method of forming an optical element having a pre-selected refractive index profile within a transparent substrate, the method comprising the steps of:
   (a) focusing an optical irradiating beam within the transparent substrate, wherein beam parameters of the optical irradiating beam are sufficient to generate a permanent refractive index change, and wherein the transparent substrate is substantially transparent over a wavelength region associated with the optical irradiating beam, and scanning a position of the focus of the optical irradiating beam relative to the transparent substrate for forming the pre-selected refractive index profile within the transparent substrate;
   (b) directing an additional optical beam through the transparent substrate, such that the additional optical beam is refracted by the optical element, and measuring one or more properties of the additional optical beam after it is transmitted by the optical element;
   (c) comparing the one or more measured properties of the transmitted additional optical beam with at least one reference property to determine an error profile, the error profile being associated with a difference between the refractive index profile formed by the optical irradiating beam and the pre-selected refractive index profile; and
   (d) controlling the beam parameters of the optical irradiating beam while scanning the optical irradiating beam relative to the transparent substrate to reduce the error profile.

2. The method according to claim 1 wherein steps (b) through (d) are performed as the optical element is being formed.

3. The method according to claim 2 wherein when performing step (a), the beam parameters are selected to avoid overexposure of the transparent substrate.

4. The method according to claim 2 wherein steps (a) through (d) are performed until a sufficient reduction in the error profile has been achieved.

5. The method according to claim 1 wherein steps (b) through (d) are performed after having formed the optical element, wherein steps (b) through (d) are performed to correct for imperfections in the optical element formed during step (a).

6. The method according to claim 1 wherein the optical element is a gradient index lens.

7. The method according to claim 1 wherein the optical element is a lens.

8. The method according to claim 1 wherein the beam parameters comprise an intensity profile and/or fluence of said optical irradiating beam.

9. The method according to claim 1 wherein the permanent refractive index change is on the order of $10^{-2}$.

10. The method according to claim 1 wherein the one or more properties comprises a beam profile of the additional optical beam.

11. The method according to claim 10 wherein the at least one reference property is a simulated beam profile based on the pre-selected refractive index profile.

12. The method according to claim 1 wherein the transparent substrate is an optical fiber.

13. The method according to claim 1 wherein the transparent substrate is an acoustically active substrate.

14. The method according to claim 13 wherein the acoustically active substrate is selected from the group consisting of PVDF, lithium niobate, PMN-PT, PZN-PT and PNN-PT.

15. The method according to claim 13 further comprising:
   while forming the optical element, electrically exciting the acoustically active substrate and generating an ultrasound beam;
   measuring one or more properties of the ultrasound beam; and
   comparing the one or more properties of the ultrasound beam with at least one ultrasound reference property for monitoring the effect of the optical irradiating beam on the performance of the acoustically active substrate.

16. The method according to claim 1 further comprising the step of:
   embedding the transparent substrate into a recess within an ultrasonic transducer, the transducer comprising an optical waveguide;
   wherein the transparent substrate is embedded such that the optical element is in optical communication with the optical waveguide.

17. The method according to claim 16 further comprising performing steps (b) to (d) one or more times in order correct errors caused during assembly of the transparent substrate and the ultrasonic transducer.

18. A method of forming an optical element having a pre-selected refractive index profile within an acoustically active transparent substrate, the method comprising the steps of:
focusing an optical irradiating beam within the acoustically active transparent substrate, wherein beam parameters of the optical irradiating beam are sufficient to generate a permanent refractive index change, and wherein the acoustically active transparent substrate is substantially transparent over a wavelength region associated with the optical irradiating beam;
wherein the optical irradiating beam is focused within the acoustically active transparent substrate such that the pre-selected refractive index profile is formed within the transparent substrate; and
wherein a position of the focus of the optical irradiating beam is scanned within the acoustically active transparent substrate for forming the pre-selected refractive index profile within the transparent substrate
the method further comprising:
(a) directing an additional optical beam through the acoustically active transparent substrate, such that the additional optical beam is refracted by the optical element, and measuring one or more properties of the additional optical beam after it is transmitted by the optical element;
(b) comparing the one or more properties with at least one reference property to determine an error profile, the error profile associated with a difference between the refractive index profile formed by the optical irradiating beam and the pre-selected refractive index profile; and
(c) controlling the beam parameters of the optical irradiating beam while scanning the optical irradiating beam to reduce the error profile.

19. The method according to claim 18 wherein steps (a) through (c) are performed as the optical element is being formed.

20. The method according to claim 19 wherein when scanning a position of the focus of the optical irradiating beam, the beam parameters are selected to avoid overexposure of the acoustically active transparent substrate.

21. The method according to claim 20 wherein steps (b) through (d) are repeated, while scanning a position of the focus of the optical irradiating beam, until a sufficient reduction in the error profile has been achieved.

22. The method according to claim 19 wherein steps (a) through (c) are performed after having formed the optical element, wherein steps (a) through (c) are performed to correct for imperfections in the optical element.

23. The method according to claim 18 wherein the optical element is a gradient index lens.

24. The method according to claim 18 wherein the optical element is a lens.

25. The method according to claim 18 wherein the beam parameters comprise an intensity profile and/or fluence of said optical irradiating beam.

26. The method according to claim 18 wherein the permanent refractive index change is on the order of $10^{-1}$.

27. The method according to claim 18 wherein the one or more properties comprises a beam profile of the additional optical beam.

28. The method according to claim 27 wherein the at least one reference property is a simulated beam profile based on the pre-selected refractive index profile.

29. The method according to claim 18 further comprising:
while forming the optical element, electrically exciting the acoustically active substrate and generating an ultrasound beam;
measuring one or more properties of the ultrasound beam; and
comparing the one or more properties of the ultrasound beam with at least one ultrasound reference property for monitoring the effect of the optical irradiating beam on the performance of the acoustically active substrate.

30. The method according to claim 18 further comprising:
attaching a backing layer to said transparent acoustically active substrate, said backing layer comprising an optical waveguide, wherein said backing layer is attached to said transparent acoustically active substrate such that the optical waveguide is in optical communication with the optical element formed within the transparent acoustically active substrate.

31. The method according to claim 30 wherein a position of the focus of the optical irradiating beam is scanned within the acoustically active transparent substrate for forming the pre-selected refractive index profile within the transparent substrate, the method further comprising performing the following steps one or more times in order correct errors caused during assembly of the transparent acoustically active substrate and the backing layer:
(a) directing an additional optical beam through the acoustically active transparent substrate, such that the additional optical beam is refracted by the optical element, and measuring one or more properties of the additional optical beam after it is transmitted by the optical element;
(b) comparing the one or more properties with at least one reference property to determine an error profile, the error profile associated with a difference between the refractive index profile formed by the optical irradiating beam and the pre-selected refractive index profile; and
(c) controlling the beam parameters of the optical irradiating beam while scanning the optical irradiating beam to reduce the error profile.

32. A method of modifying the refractive index of an optical component embedded within an ultrasonic transducer, the method comprising the steps of:
focusing an optical irradiating beam within the optical component, wherein beam parameters of the optical irradiating beam are sufficient to generate a permanent refractive index change, and wherein the optical component is substantially transparent over a wavelength region associated with the optical irradiating beam;
scanning a position of the focus of the optical irradiating beam within the optical component;
determining an error profile associated with a spatial dependence of the refractive index of the optical component; and
controlling the beam parameters of the optical irradiating beam while scanning the optical irradiating beam to reduce the error profile.

33. The method according to claim 32 wherein the error profile is determined by:
directing an additional optical beam through the optical component, such that the additional optical beam is refracted by the optical component, and measuring one or more properties of the additional optical beam after it is transmitted by the optical component; and comparing the one or more properties with at least one reference property to determine the error profile.

* * * * *